US012613104B2

(12) United States Patent
Couleaud et al.

(10) Patent No.: US 12,613,104 B2
(45) Date of Patent: Apr. 28, 2026

(54) VEHICLE NAVIGATION METHODS TO MAXIMIZE OPERATOR'S INTENT

(71) Applicant: Adeia Guides Inc., San Jose, CA (US)

(72) Inventors: Jean-Yves Couleaud, Mission Viejo, CA (US); Dhananjay Lal, Englewood, CO (US); Tao Chen, Palo Alto, CA (US); Zhiyun Li, Kenmore, WA (US)

(73) Assignee: Adeia Guides Inc., San Jose, CA (US)

( * ) Notice: Subject to any disclaimer, the term of this patent is extended or adjusted under 35 U.S.C. 154(b) by 276 days.

(21) Appl. No.: 18/213,690

(22) Filed: Jun. 23, 2023

(65) Prior Publication Data

US 2024/0426621 A1 Dec. 26, 2024

(51) Int. Cl.
| | |
|---|---|
| *G01C 21/36* | (2006.01) |
| *G01C 21/34* | (2006.01) |
| *G06F 40/40* | (2020.01) |

(52) U.S. Cl.
CPC ..... *G01C 21/3492* (2013.01); *G01C 21/3461* (2013.01); *G01C 21/3469* (2013.01); *G01C 21/3608* (2013.01); *G01C 21/3617* (2013.01); *G01C 21/3697* (2013.01); *G06F 40/40* (2020.01)

(58) Field of Classification Search
CPC .............. G01C 21/343; G01C 21/3608; G01C 21/3617; G01C 21/3697; G01C 21/3461; G01C 21/3492; G06Q 30/0265; G06Q 30/0266
See application file for complete search history.

(56) References Cited

U.S. PATENT DOCUMENTS

| | | | |
|---|---|---|---|
| 6,714,860 | B1 * | 3/2004 | Wawra ................... G01S 19/14 |
| | | | 701/538 |
| 7,098,870 | B2 | 8/2006 | Wampler et al. |
| 7,515,136 | B1 | 4/2009 | Kanevsky et al. |
| 9,183,685 | B2 | 11/2015 | Ricci |

(Continued)

FOREIGN PATENT DOCUMENTS

WO          2014067951 A1          5/2014

OTHER PUBLICATIONS

Anonymous, "Alexa Auto Design Guidelines, Navigation" (https://developer.amazon.com/en-US/docs/alexa/alexa-auto/navigation.html) (downloaded Jul. 25, 23) (5 pages).

(Continued)

*Primary Examiner* — Dino Kujundzic
(74) *Attorney, Agent, or Firm* — HG LAW LLP

(57) ABSTRACT

Systems and methods for enabling route determination to maximize an operator's intent are described. In an example, a method includes receiving an input via a user interface, the input comprising a destination. The method also includes determining a primary goal and a secondary goal, wherein the primary goal comprises identifying a traversable route from a starting location to the destination, determining a plurality of waypoints based on the secondary goal, and determining a plurality of candidate routes based on the starting location and the destination. The method then includes identifying, from among the plurality of candidate routes, based on a number of waypoints of the plurality of waypoints positioned along each respective route of the plurality of candidate routes, a target route, and generating for navigation by a vehicle, the target route.

18 Claims, 10 Drawing Sheets

(56) References Cited

U.S. PATENT DOCUMENTS

| | | | | |
|---|---|---|---|---|
| 9,488,485 | B2 * | 11/2016 | Letz | G01C 21/343 |
| 10,139,243 | B2 * | 11/2018 | Rovik | G01C 21/3476 |
| 10,769,667 | B2 * | 9/2020 | Zavesky | G06Q 30/0269 |
| 10,970,746 | B2 * | 4/2021 | Singhal | B60W 10/06 |
| 11,060,878 | B2 | 7/2021 | Grochocki et al. | |
| 11,359,926 | B2 * | 6/2022 | Galan-Oliveras | |
| | | | | G01C 21/3461 |
| 11,402,223 | B1 | 8/2022 | Grealish-Rust et al. | |
| 11,448,516 | B2 | 9/2022 | Johnson et al. | |
| 11,941,009 | B1 * | 3/2024 | Katragadda | G06F 16/9537 |
| 2010/0094534 | A1 * | 4/2010 | Naick | G01C 21/3484 |
| | | | | 701/532 |
| 2012/0041672 | A1 * | 2/2012 | Curtis | H04W 4/60 |
| | | | | 701/426 |
| 2013/0060642 | A1 * | 3/2013 | Shlomot | G06Q 30/0241 |
| | | | | 705/14.66 |
| 2014/0006160 | A1 * | 1/2014 | McDevitt | G06Q 30/0259 |
| | | | | 705/14.57 |
| 2014/0257988 | A1 * | 9/2014 | Prakah-Asante | G01C 21/3484 |
| | | | | 701/538 |
| 2015/0348112 | A1 * | 12/2015 | Ramanujam | G06Q 30/0266 |
| | | | | 705/14.63 |
| 2016/0110759 | A1 * | 4/2016 | Polehn | G06Q 30/0251 |
| | | | | 705/14.49 |
| 2017/0059338 | A1 * | 3/2017 | Sofinski | G01C 21/343 |
| 2018/0094943 | A1 * | 4/2018 | Grochocki, Jr. | G01C 21/3492 |
| 2018/0172464 | A1 * | 6/2018 | Sekizawa | G06V 40/174 |
| 2019/0120654 | A1 * | 4/2019 | Todasco | G01C 21/3476 |
| 2020/0356100 | A1 * | 11/2020 | Nagarajan | G05D 1/247 |
| 2020/0402099 | A1 * | 12/2020 | Pittman | H04L 67/1097 |
| 2021/0150577 | A1 * | 5/2021 | Hacker | G06Q 30/0241 |
| 2022/0116673 | A1 * | 4/2022 | Cho | G06Q 30/0265 |

OTHER PUBLICATIONS

Anonymous, "Enjoy the Nicest Routes—Route You," (https://www.routeyou.com/) (9 pages) (downloaded Jul. 25, 2023).

Anonymous, "How Much Does a Billboard Cost?," (https://www.indeed.com/hire/c/info/how-much-does-a-billboard-cost) (downloaded Jul. 25, 2023) (15 pages).

Anonymous, "Lexus Navigation—Navigation—Set Point-Of-Interest (POI)," (https://www.lexus.com/My-Lexus/resources/video-detail-page/navigation/set-point-of-interest) (downloaded Jul. 25, 2023).

Anonymous, "Lighting Up City Streets with Smart Screens and Smarter Data," (https://www.fireflyon.com/) (downloaded Jul. 25, 2023) (pages).

Anonymous, "XC60 Specify destination with point of interest," (https://www.volvocars.com/en-th/support/car/xc60/17w46/article/771c5b5ea3b95c3ac0a801510ad644bc) (downloaded Jul. 25, 2023) (Updated Jul. 23, 2018).

Nagy, "Heritage Tourism, Thematic Routes and Possibilities for Innovation," Club of Economics in Miskolc TMP, 8(1):46-53 (2012).

Waze.com, "Driving Directions," (https://www.waze.com/live-map/) (downloaded Jul. 25, 2023) (1 page).

Wikipedia, "Vehicle-to-everything," (https://en.wikipedia.org/wiki/Vehicle-to-everything) (Downloaded Jul. 25, 2023) (9 pages).

* cited by examiner

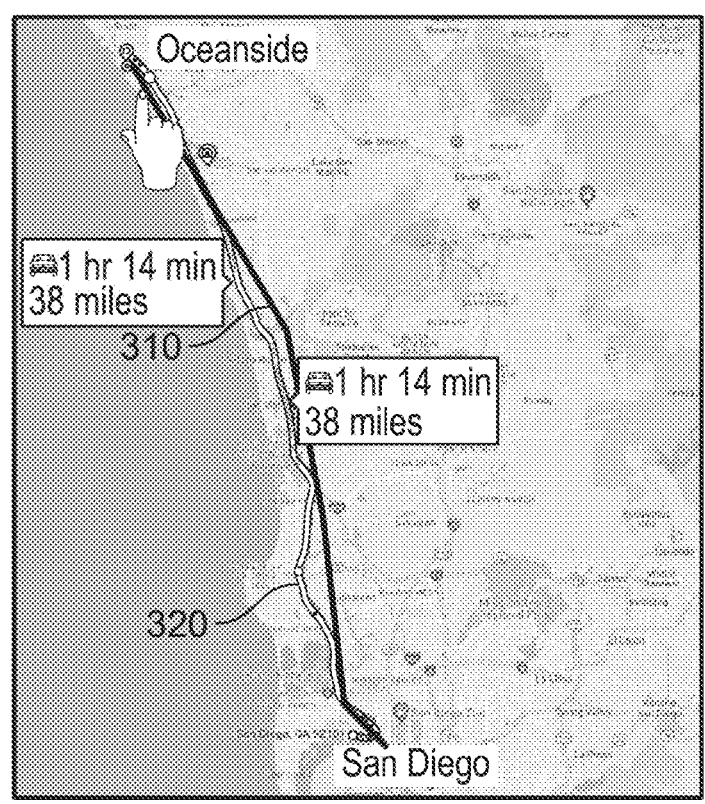
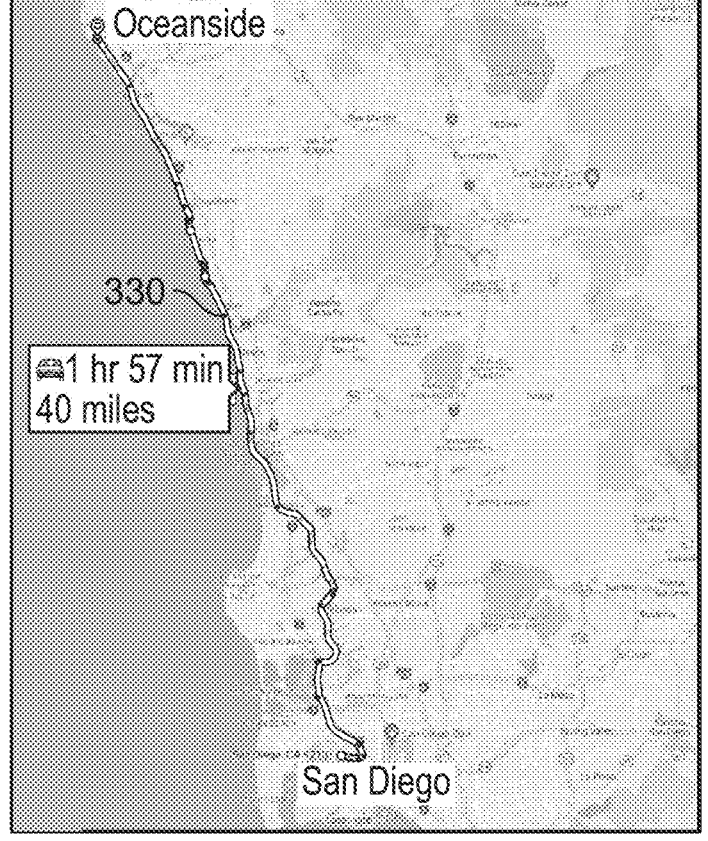
FIG. 3

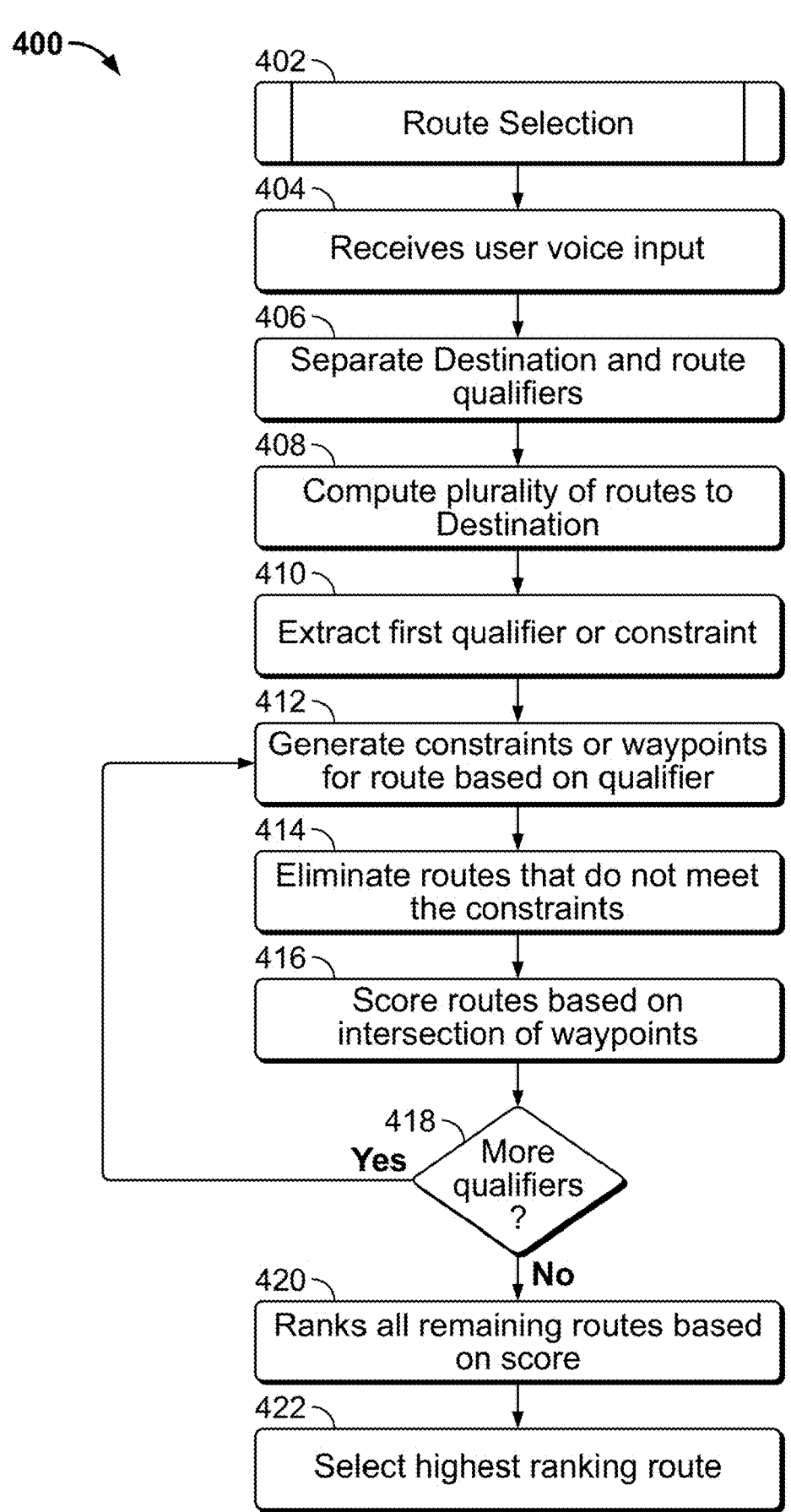

400

402 ─ Route Selection

404 ─ Receives user voice input

406 ─ Separate Destination and route qualifiers

408 ─ Compute plurality of routes to Destination

410 ─ Extract first qualifier or constraint

412 ─ Generate constraints or waypoints for route based on qualifier

414 ─ Eliminate routes that do not meet the constraints

416 ─ Score routes based on intersection of waypoints

418 ─ More qualifiers?     Yes     No

420 ─ Ranks all remaining routes based on score

422 ─ Select highest ranking route

FIG. 4

VEHICLE NAVIGATION METHODS TO MAXIMIZE OPERATOR'S INTENT

BACKGROUND OF THE INVENTION

One or more embodiments of the present disclosure relate to enabling route determination based on natural language inputs to maximize alignment of the resulting route with the operator's intent. Embodiments also relate to enabling route determination based on maximizing exposure to external advertising surfaces. Some embodiments may relate to other features, functionalities, or fields.

SUMMARY

Partially or fully autonomous vehicles are becoming a larger part of the transportation landscape. In the future, people may own or operate not just an autonomous car, but potentially also autonomous aircraft, watercraft, and even spacecraft. For each of these vehicles, an operator may wish to issue a command directly (e.g., take me to my destination), without having to input an exact route or turn-by-turn directions.

Additionally, while a user may have a primary goal of reaching the destination in the shortest time or using the least energy, the user may have a secondary goal such as avoiding traffic, maximizing enjoyment, driving through memorable scenery, or driving past iconic landmarks, any of which may sacrifice travel time or energy use. In some cases, a fleet operator (e.g., Uber) may want to minimize the cost of transportation (energy and time) while also maximizing revenue through secondary means such as exposure to advertisement or ancillary on-board sales.

In one approach, a platform determines a route based on user preferences, such as "nicest route," "fastest route," or "asphalt only." However this approach does not allow for a user to input a request using a natural language input, such as "I want to go to San Diego on the coastal road."

In another approach, a platform determines a route including selected points of interest input by a user. However, this approach has the user manually input the points of interest, and does not allow for a user to input a natural language request that generalizes the user's requested type of point of interest such as "the ocean" or "historic churches."

In another approach, a platform determines a route based on user preferences or profiles of two occupants, including previously made stops and corresponding feedback. However, this approach does not include automatic collection of user preferences from sources such as digital photo albums, transaction history, or a digital wallet.

In another approach, a platform determines a route using a scenic route index based on a list of points of interest and historical data about traffic and traffic stops at certain locations. However, this approach does not enable inputs in a natural language format, nor does it enable the determination of a route personalized to the requesting user.

Systems and methods of this disclosure solve these issues and more by providing a navigation application that receives a natural language input comprising a destination and one or more natural language qualifiers, such as "along the coast" or "through the forest." The navigation application then parses or interprets the natural language qualifier, and determines a plurality of waypoints based on the parsed natural language qualifier. A plurality of candidate routes is then determined from the start location to the input destination, and the navigation application identifies a target route from the candidate routes based on the determined waypoints. In one example, this includes identifying the route that maximizes the number of waypoints passed along the route. The route is then presented via a user interface.

In some embodiments, the navigation application may determine the waypoints based on a digital photo album, transaction history, and/or digital wallet of a user profile corresponding to the input request. For instance, the navigation application may determine a preference for a particular route through the forest based on the prevalence of photos of a specific type of tree that is present only in a certain area of the forest. Or the navigation application may prioritize certain waypoints over others based on the prevalence of a certain style of architecture present in many photos.

In some embodiments, the natural language input may also include constraints, such as a maximum time period for the trip, a maximum duration of the trip or a desired arrival time, a desire to avoid certain roads or areas, or a desire to maintain a certain level of vehicle autonomy at all stages of the trip. The navigation application may parse the constraints from the natural language input, and consider these constraints along with the waypoints in determining a target route.

In some embodiments, the navigation application may determine two or more target routes that optimize different aspects. For instance, a first target route may have the shortest travel time, while a second target route may have a slightly longer travel time but passes by more waypoints or points of interest. Both target routes may be presented via a user interface (including presenting natural language audio or text), and the navigation application may indicate the specifics of the target routes so that an informed decision can be made by the user.

As noted above, route determination for a fleet of vehicles, such as Uber, may include the fleet operator minimizing the cost of transportation (e.g., energy and time) while also maximizing revenue through secondary means such as exposure to advertisements or ancillary on-board sales. To that end, in one approach, billboards are controlled to dynamically display ads based on the time, location, and number of people in proximity to the billboard. In another approach, ads are placed on vehicles (e.g., the top or sides of a taxi) to reach a wider audience as the vehicle travels. However, these approaches do not provide the ability to transport passengers to the ads, nor do they enable first party information about impressions to be collected from viewers of the ads.

Systems and methods of this disclosure solve these issues and more by providing a navigation application that receives a destination, and determines the location of a plurality of external advertisement surfaces (e.g., billboards, signage, storefronts, etc.). A plurality of candidate routes is then determined from the start location to the input destination, and the navigation application identifies a target route from the candidate routes by maximizing the number of external advertisement surfaces along the target route, while also considering the trip duration and/or energy use. That is, where the navigation application determines two possible routes that both have the same predicted duration (or are within a threshold from each other), the navigation application may select the route that passes by the greater number of external advertisement surfaces. The target route is then presented via a user interface, or may simply be chosen without presentation in the case of a fully autonomous vehicle.

In some embodiments, the navigation application may also determine a ranking of the external advertisement surfaces based on the user profile of the user requesting the route, and/or the profiles of other passengers or occupants of the vehicle. Some external advertisement surfaces may be more or less relevant to the user based on the user preferences and/or based on the specific time at which the external advertisement surfaces are viewed during the drive (e.g., restaurant ads may be more relevant before mealtimes than after, hotel ads may be more relevant at the end of the day, etc.) and so the external advertisement surfaces may be ranked or prioritized based on one or more factors. The navigation application may then determine the target route based on the ranked list of external advertisement surfaces.

In some embodiments, the vehicle may travel along the target route. As the vehicle approaches an external advertisement surface, the navigation application may cause a corresponding advertisement to be displayed inside the vehicle. Alternatively or additionally, the external advertisement surface may be instructed to change the displayed content to be more relevant to the user (or other occupants) inside the approaching vehicle.

In still other embodiments, the navigation application may present two or more options to the user, each having a different price. The navigation application may reduce the price of a trip based on the number of external advertisement surfaces along the route. The user may be presented with an opportunity to save money on a trip if they opt to take a less direct route, but are exposed to more external advertisement surfaces.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which:

FIG. 3 illustrates an example wherein a user draws a desired route, according to aspects of the present disclosure;

FIG. 4 illustrates an example process for identifying candidate routes based on natural language input, according to aspects of the present disclosure;

DETAILED DESCRIPTION

As noted above partially and/or fully autonomous vehicles are most likely going to be part of our transportation landscape in the near future. As a consequence, the operator of the vehicle may want to directly give an order using natural language (e.g., "take me to that destination") to cause the vehicle to identify and traverse a suitable route, or to determine a route indirectly via a third party, referred to as a "fleet operator" in this disclosure, such as when leasing the vehicle for service. In each scenario (i.e., direct request by the vehicle occupant or indirect route determination via a third party), the operator may have a different intent. They both have a primary goal of transporting the vehicle occupants from the starting location to the destination, but each may have a different secondary goal. For example, as a vehicle owner, one may expect the journey to be as enjoyable as possible, potentially sacrificing travel time to get a better overall experience such as avoiding traffic, driving through a memorable scenery or past iconic landmarks. A fleet operator may want to minimize the cost of transportation (e.g., energy and time) while maximizing revenue through secondary means such as exposure to advertisements or ancillary on-board sales.

Some navigation applications and/or guidance systems do not automatically and unobtrusively factor in the operator's intent when determining the optimal route for a vehicle to take. This disclosure includes example navigation methods and techniques that take into account the preferences of a vehicle operator (i.e., whether an individual or a fleet operator) to select a target route for a vehicle to follow.

Two independent but overlapping techniques are proposed. FIGS. 1-4 are directed to embodiments wherein a navigation application incorporates the vehicle occupant's preferences along with natural language input to identify a target route, and allows the vehicle to take advantage of autonomous driving capabilities. FIGS. 5-9 relate to embodiment in which a navigation application maximizes exposure of vehicle occupants to external advertisement surfaces as well as in-vehicle displays to maximize additional sources of revenue. In each technique, occupant profiles and other sources of information can be used to optimize the selection of a target route.

It should be appreciated that the two techniques disclosed herein are not mutually exclusive. That is, features discussed with reference to FIGS. 1-4 may also apply to the embodiments described with reference to FIGS. 5-9, and vice versa. Any determinations, analysis, presentation of information, etc. may apply to any embodiment disclosed herein.

Figure 1:
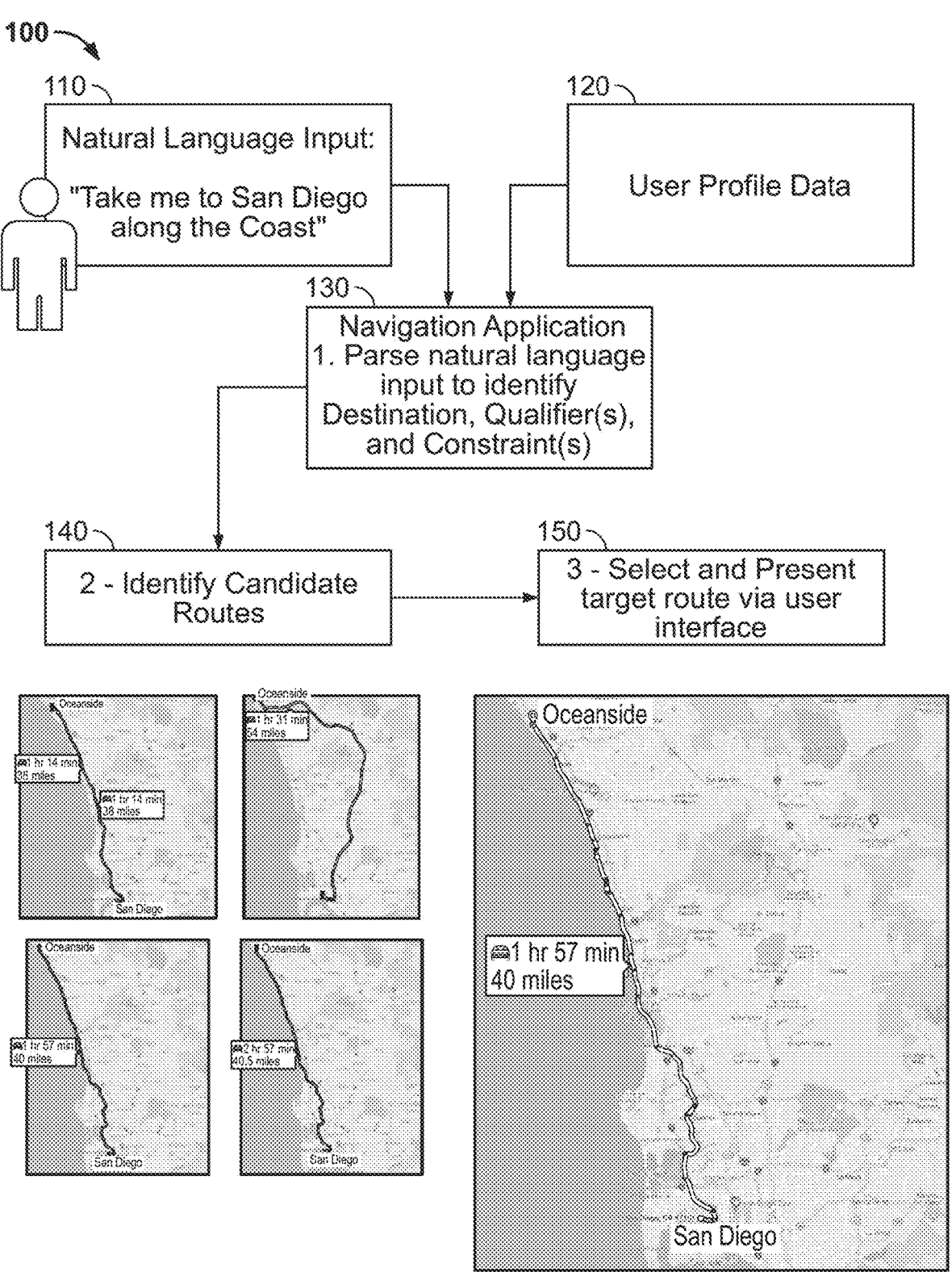
FIG. 1 illustrates an example scenario for determining a route that maximizes operator intent input via natural language, according to aspects of the present disclosure.
Figure 2A:
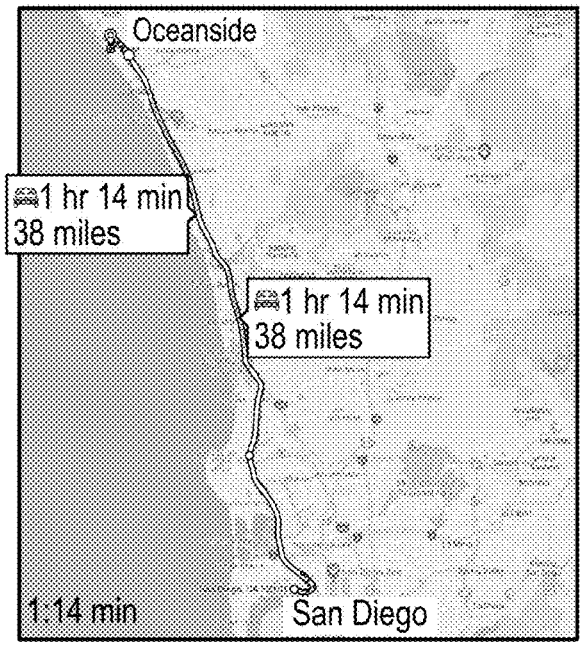
FIGS. 2A-D illustrate example candidate routes identified based on natural language input, according to aspects of the present disclosure.
Figure 2B:
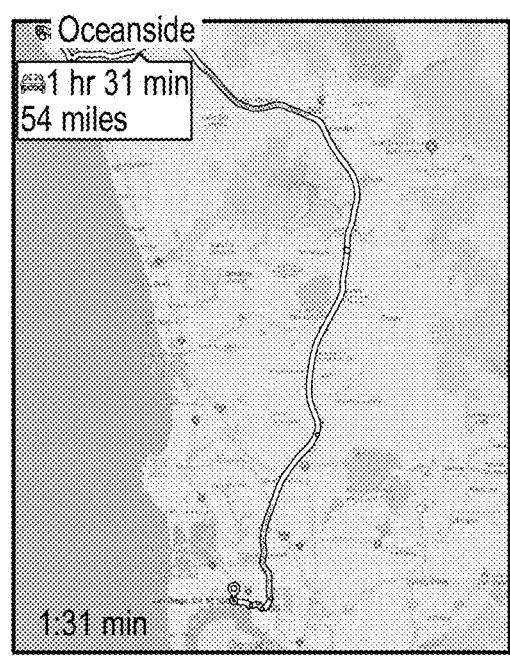
Figure 2C:
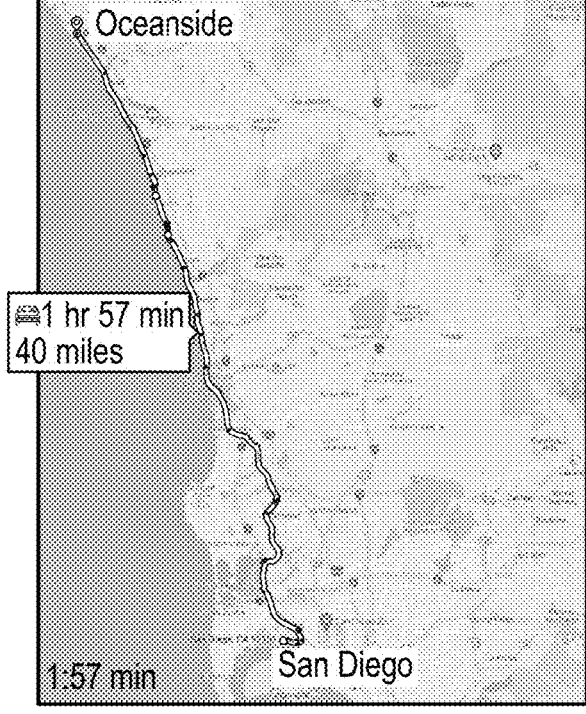
Figure 2D:
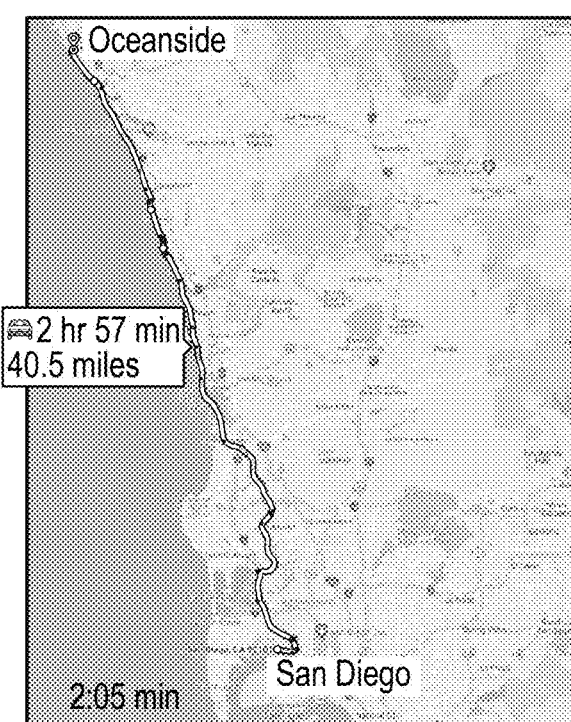

FIG. 1 illustrates a scenario 100 in which a user makes a natural language input 110 to a navigation application 130, requesting a route. The navigation application 130 parses the natural language input to identify a destination, one or more qualifiers, and one or more constraints. The navigation application may also retrieve user profile data 120 corresponding to the user requesting the route. The navigation application then identifies a plurality of candidate routes between a staring location and the identified destination at step 140. The navigation application then removes candidate routes that do not meet the qualifiers and/or constraints, identifies the best route or "target route," and presents the target route via a user interface at step 150. Additionally or alternatively, the navigation application may send the target route to a secondary device such as a mobile device for confirmation, and/or may temporarily display the target route on a vehicle display for confirmation. Additionally, in some cases, such as where the vehicle is fully autonomous, the navigation application may not present the target route via a user interface.

Scenario 100 is one example scenario illustrating how a navigation application may go about receiving user preferences and instructions, and then selecting an appropriate target route that meets various qualifiers and constraints corresponding to the user's request made using natural language and general terms. Embodiments disclosed herein enable a navigation application to: (a) receive natural language input and identify a destination from the natural language input, (b) parse or extract qualifiers and/or constraints from the natural language input, to convert the input into a plurality of waypoints used to identify an optimal route, (c) retrieve additional information pertaining to a user or users connected with the request for a route, such as user preferences, digital photos or videos, and other information stored in a user profile, (d) construct or select one or more routes that pass by a number of waypoints while remaining within the identified constraints, and (e) present the one or more routes via a user interface, receive confirmation of a target route, and enable the vehicle to travel along the target route. In some examples, step (e) may be optional, particularly where the vehicle is self-driving.

In one example, a user may seek to travel from Los Angeles to San Francisco. It may be very efficient to take Highway 5 all the way. Google Maps estimates that this route would take approximately seven hours at the current speeds of non-autonomous vehicles. However, if the user chose to take the "coastal route" or the "National Park route," the estimated travel time can change dramatically. In this example, a coastal route on the Pacific Coast Highway (PCH), driving through Malibu, Santa Barbara, Cambria, Carmel, Monterey, Santa Cruz, and Half-Moon Bay would take approximately nine to ten hours. Alternatively, following a route through the National Parks of Death Valley and Yosemite, the journey can expand to well over fifteen hours. If a navigation application were to focus on finding an optimal route based only on efficiency (e.g., in terms of route duration and energy consumption), users interested in tourism (or in finding routes other than those that are the most optimally efficient from a time and energy perspective) may be forced into pre-canned itineraries when navigating between point A and point B, and will most likely miss the sites they may have wanted to visit in-between. To avoid this, users may be required to identify their own route, and/or instruct a vehicle to travel to each desired site which would be equivalent to creating several itineraries, when just one would be natural for a human driver looking at a map. "Heritage Tourism" is a popular concept, especially in Europe, wherein users are interested in visiting or passing by historic sites.

In an example of the present disclosure, a navigation application first receives an input via a user interface. The input may be made to the user interface of a vehicle in text, voice, or any other suitable mode of input. Additionally, the user interface may be a part of the vehicle (i.e., a touchscreen in a center console), or may be separate from the vehicle (such as a smartphone, tablet, or other handheld device). The input itself may comprise a request to travel from a starting location to a destination, or a request to identify a route from a starting location to a destination, for example. The navigation application may automatically identify the starting location based on the location of the vehicle, or may receive the starting location as input to the user interface. In some examples, the navigation application may determine the starting location based on the location of the user interface (e.g., the location of the vehicle, the location of the smartphone or other device, etc.). In other examples, the starting location may be different from the current location of the user interface receiving the input, such as where a user in a first location requests that the navigation application determine a route from a second location to a third location.

The input to the user interface may be natural language. That is, the input may be made in general terms, such as "take me to Napa through the forest," or "take me to San Diego along the coast." The natural language input may include generalized language that encompasses a plurality of points of interest, waypoints, or other identifiable locations without requiring individual selection. For example, the natural language input may include terms such as "the ocean," "historic churches," or "the forest."

The natural language input may include natural language qualifiers and constraints. The qualifiers and constraints may be extracted from the natural language input using any suitable technique known in the art, such as sentiment analysis, named entity recognition, summarization, topic modeling, text classification, keyword extraction, lemmatization and stemming, tokenization, stop words removal, and more. Qualifiers may be understood as terms that the navigation application seeks to maximize, or desired features of a route based on the user's input. For example, a qualifier of "along the coast" reflects a desire to maximize the number of waypoints or time spent traveling along the coast when driving along a route from the starting location to the destination. Similarly, a qualifier of "historic churches" reflects a desire to maximize the number of waypoints or time spent traveling nearby historic churches when driving along a route from the staring location to the destination. Example natural language qualifiers can be any desired aspect of a resulting route determined by the navigation application and parsed from the natural language input, such as (a) desired scenery, (b) desired geography, (c) desired points of interest, (d) desired landmarks, (e) desired road type, (f) desired level of vehicle autonomy available, or (g) any route qualifier which the user desires to maximize, but which is not strictly required.

Constraints, on the other hand, may be understood as terms that the navigation application must consider in determining a target route from the natural language input. For example, a constraint of "arrive in less than two hours" reflects a requirement that the target route identified by the navigation application must have an expected duration of less than two hours. A constraint of "avoid switchbacks," reflects a requirement that the target route identified by the navigation application must not include any segment that travels along a switchback. Example natural language constraints can be any required aspect of a resulting route determined by the navigation application and parsed from the natural language input, such as (a) required maximum trip duration, (b) required arrival time, (c) required maximum energy usage (or requirement that the route selected use the minimum energy possible), (d) requirement to avoid certain roads or road types (e.g., "avoid highways," "avoid switchbacks," "avoid two-lane highways," "avoid bridges," etc.), (e) requirement to avoid certain road conditions (e.g., "avoid gravel," "avoid icy roads," etc.), (f) requirement to avoid the need for chains, (g) requirement to maintain a minimum available vehicle autonomy level along the route, (g) requirement to avoid certain areas (e.g., "avoid high crime areas"), (h) avoid large changes in elevation, and more.

As indicated above, the navigation application may receive the natural language input at a user interface. In some examples, the user may speak the natural language input using a microphone of the vehicle or their smartphone or other device coupled to the navigation application (e.g., a voice assistant). The navigation application may include sufficient processing power or may have access to sufficient processing power to receive and analyze the natural language input, as well as to determine one or more candidate routes and identify a target route to present via the user interface as described below.

In some examples, the navigation application may be separate from the vehicle. The navigation application may be used for planning a trip in advance, and as such may be part of a separate computing device or system. The navigation application may receive the natural language input, and may transmit the information to a server for processing and determination of the target route, as described below.

In some examples, the natural language input may be understood as specifying a primary goal and a secondary goal. The primary goal may be to identify a traversable route between a starting location and a destination. Identifying a traversable route may include identifying a route that is not blocked, and simply factors in available roads, but does not consider more nuanced or higher tier factors such as points of interest, traffic conditions, road conditions, etc.

The secondary goal may be identified from the natural language input. In some examples, the secondary goal may be simple goals such as a fastest route, a shortest route, or a more energy efficient route. The secondary goal may also include more complex considerations, such as to see historic churches, take a route along the coast, travel through the forest, avoid traffic, avoid certain roads, road types, road conditions, maintain certain level of autonomous vehicle availability (i.e., level 3 or higher), arrive before X time, travel less than X time, etc. The secondary goal may be a combination of the natural language qualifiers and constraints identified from the natural language input. In some examples, the navigation application may identify the primary and/or secondary goal based only on the natural language input. In other examples, the navigation application may identify the primary and/or secondary goal based on both the natural language input and based on profile data associated with a user (or multiple users) that made the natural language input or were present in the vehicle when the natural language input was made.

After the navigation application received the natural language input, the navigation application analyzes the input to identify a destination, one or more natural language qualifiers, and one or more natural language constraints. The navigation application uses the qualifiers to determine a plurality of waypoints. The waypoints may be based on the secondary goal (e.g., historic churches in the area, where the forest is located, where the coast is located, etc.). In some examples, waypoints may be understood as identifiers or locations that are desired based on the natural language input qualifiers.

For example, if the natural language input is "take me to San Diego and I want to see historic churches," the navigation application may identify the qualifier "historic churches" and determine that the secondary goal is to drive by as many historic churches as possible. In this case, the navigation application may identify all historic churches (i.e., by searching a database to determine which churches are deemed "historic" along with their respective locations) and associating each historic church with a waypoint. The navigation application may only search within a threshold area (e.g., within ten miles from the start or destination, within ten miles from a direct route to San Diego, or some other area).

In another example, if the natural language input is "take me to San Diego and maximize vehicle autonomy level," the navigation application may identify the qualifier "maximize vehicle autonomy level" and that the secondary goal is to travel along a route that allows for the greatest amount of autonomous driving. In this case, the navigation application may determine a vehicle autonomy level associated with each road segment between the start location and the destination, and associate waypoints with each segment. Segments that have higher autonomy levels may have a greater number of waypoints, higher weighted waypoints, or some other indicator to identify those segments as preferred.

Vehicle autonomy level may refer to the level of driving automation allowed (i.e., level 0, 1, 2, 3, 4, or 5). Level 0 "no driving automation" may refer to vehicles that are manually controlled, with no driving automation. Level 1 "driver assistance" may refer to vehicles that include a single automated system for driver assistance, such as steering or accelerating (e.g., cruise control). Level 2 "partial driving automation" may refer to vehicles that include advanced driver assistance systems, or ADAS. The vehicle can automatically control both steering and acceleration/deceleration. Level 3 "conditional driving automation" may refer to vehicles that have environmental detection capabilities and can make informed decisions, such as accelerating past a slow-moving vehicle. However, level 3 vehicles still require human override, and the driver must remain alert and ready to take control if the vehicle is unable to execute a task. Level 4 "high driving automation" may refer to vehicles that can intervene if things go wrong or there is a system failure. Level 4 vehicles can operate in self-driving mode without the need for human input, but have an option for a human to manually override. Level 4 vehicles are currently limited in their geographical area of operation due to legislation and the current state of infrastructure. Level 5 "full driving automation" may refer to vehicles that do not require human attention, and may not even have steering wheels or accel-eration/braking pedals. Examples in the present disclosure may refer to roads or road segments that are associated with a particular level of vehicle autonomy, and should be understood as referring to roads or road segments for which each level of vehicle autonomy is supported. That is, an example having a goal of maintaining vehicle autonomy level of level 3 or higher may correspond to a goal of travelling along a route having road segments for which the supported vehicle autonomy level is level 3, level 4, or level 5.

In some examples, the navigation application may weight one or more waypoints differently from others. For example, in the "historic churches" example above, more searched-for churches or more visited churches may have associated waypoints that are more heavily weighted than less searched-for or less visited churches. Similarly, in the "maximize vehicle autonomy level" example above, road segments with higher vehicle autonomy levels may have waypoints weighted higher than road segments with lower vehicle autonomy levels.

Additionally, the navigation application may determine and/or weight one or more waypoints based on the user profile of the user who made the natural language input. For example, the user profile may include information related to a digital photo album, a transaction history, or a digital wallet of the user. The navigation application may access this information to identify or infer preferences of the user. For example, a preference for historical monuments or city landmarks based on the presence of these points of interest in the user's photo album, or a preference for a particular forest based on the presence of a specific type of tree in the user's pictures that are present in that forest. The navigation application may also identify user preferences based on text information of the user profile, such as transactions, a record of concert tickets or other digital wallet items, or other interactions the user has had. These interactions may have associated locations and other information that can be used by the navigation application to determine user preferences that can inform the weights for various waypoints. In some examples, the navigation application may maintain metadata for each waypoint and may perform matching between the user preferences and/or other information from the user profile and the metadata associated with nearby (or possibly enroute) waypoints. In an example, the navigation application may determine one or more weights based on the user profile. For instance, if the user has already visited a church or a photo associated with the user profile includes the church, that church may be weighted lower (or higher) depending on user preferences.

In some examples, the navigation application may determine one or more waypoints based on the user profile associated with the user making the natural language input as well as the user profiles of other users that are present (e.g., other occupants of the vehicle). The navigation application may identify the vehicle occupants using any suitable technique (e.g., user detection via camera or image sensor, Bluetooth connections, input of additional occupants via the user interface, etc.), and may retrieve corresponding profiles. This may be useful in situations in which multiple users' preferences should be accounted for (e.g., during a road trip, family vacation, etc.). In some examples, the navigation application may prioritize one or more user profiles over the others, such as prioritizing the vehicle owner, the driver (identified using in-vehicle position detection), the parent (e.g., when taking a family trip), the most used profile, etc.

The navigation application may also determine a plurality of candidate routes based on the starting location and the destination determined from the natural language input. In some examples, the plurality of candidate routes may be determined without regard for the identified waypoints. That is, the navigation application may determine a plurality of candidate routes that enable travel from the starting location to the destination without factoring in the location(s) of the waypoints. Candidate routes may be identified using any suitable path finding technique, such as shortest path, A*, all-pairs shortest path, single source shortest path, minimum spanning tree, random walk, Dijkstra's algorithm, RIPA algorithm, depth first search, breadth first search, etc.

The navigation application then identifies a target route from among the plurality of candidate routes. In some examples, this includes removing from consideration all candidate routes that fail to meet the constraint(s), and then ranking the remaining routes based on the number of waypoints that the route travels past. The navigation application may determine an optimal candidate route that intersects the maximum number of waypoints while meeting the maximum constraints. As such, in this determination one or more tradeoffs can occur. For example, if the navigation application identifies ten waypoints from the natural language qualifier, and determines that the associated constraint is a requirement that the duration of the route be less than one hour, route A that travels by all ten waypoints but takes two hours may be discarded since it does not meet the required constraint. Route B, which travels by nine waypoints and is 59 minutes, may be preferred over route C, which travels by eight waypoints and takes 55 minutes.

In some examples, selection of the target route from among the candidate routes can include identifying the candidate route that travels by the greatest number of waypoints. In other examples, it can include identifying the route that travels by the waypoints that are weighted the highest (e.g., wherein the total of all waypoints along the route is the greatest, factoring in any weights, even if the absolute number of waypoints is not the greatest). For instance, two nearly identical routes that each meet the constraints from the natural language input and each pass by five waypoints, may be differentiated based on the weights of the particular waypoints each route passes by. Route A that passes by higher weighted waypoints may be selected over route B that passes by lower weighted waypoints, even if they both meet the constraints and pass by the same number of waypoints.

In some examples, the navigation application may identify all possible candidate routes first, before determining the target route from the plurality of candidate routes. In other examples, the navigation application may perform an iterative analysis, by determining a first candidate route and setting the target route as the candidate route. Then, as additional candidate routes are determined, the navigation application may compare the additional route(s) to the target route to determine which is better, and update the target route. In this manner, the target route may be determined in an iterative manner at the same time as the candidate routes are determined. The navigation application need not necessarily identify all possible candidate routes prior to determining the target route. Additionally, in some examples, the navigation application may rank the plurality of candidate routes, and select the top ranked candidate route as the target route. The navigation application may also identify two or more target routes, such as by identifying the top two or more candidate routes from the ranked list of candidate routes.

After identifying the target route(s), the navigation application may then generate for display via the user interface, the target route(s). In some examples, this may include generating for display a single target route, two target routes, or more. The navigation application may also generate for presentation (either visually or audibly) a prompt for the user to input a confirmation of the selected target route. In some examples, the navigation application may also present a prompt indicating the differences between two or more target routes. For instance, if the navigation application identifies two target routes, it may present information that the first target route is shorter by X minutes, but passes by Y fewer waypoints than the second route. As such, the user is prompted to select between a shorter but less interesting route and a longer but more interesting route. The user may make an evaluation, and provide a suitable input to the navigation application selecting the desired route. The user selection may be stored or associated with the user profile, which may be used in future route planning to weight one or more routes based on the user selection. For instance, if a user selects a longer but more interesting route, the navigation application may change one or more thresholds or decision-making values so that it is more likely to present longer but more interesting routes in the future. Additionally, if in the future the user initiates a route planning operation with the same destination, the navigation application may present the longer but more interesting option as the first option.

The navigation application may present the information regarding the target route(s) via the user interface by generating for display the first target route and the second target route, and generating for display an indication that the second target route has a longer expected duration than the first target route and passes by or through a greater number of waypoints than the first target route. The navigation application may also or alternatively present any other suitable information that differentiates the first and second routes (and/or any other identified target routes). In one example, where the vehicle is fully autonomous, the vehicle may provide an audio output indicating "I found a great route for you, let's go."

In some examples, the navigation application may include a conversational AI assistant that may, based on user preferences, suggest one or more waypoints or points of interest to the user, and may perform routing by determining the qualifiers and constraints during the conversation. That is, the navigation application may perform the functions described herein iteratively, or in multiple stages, based on a back and forth conversation with the user. There may be more than one natural language input, and/or the natural language input described herein may be input in stages. The navigation application may prompt the user to add additional qualifiers and/or constraints (e.g., "how long would you like the route to take?"—"less than an hour"). Additionally, once one or more target routes are identified, the conversational AI assistant may provide audio output to prompt the user for a selection between different target routes. For example, the navigation application may output: "I can take you there most efficiently in fifteen mins, but if you prefer I can stop by the monument X, in which case we may take twenty minutes to arrive. Would you like to take this route instead?"

Once the navigation application identifies a target route, and optionally if a confirmation of the target route is received, the navigation application may then execute the selected route. Executing the selected route can take various forms. In some examples, this may include causing an autonomous vehicle to travel along the target route. In other examples, this may include beginning navigation, allowing the user to travel along the route and updating the map as the vehicle moves. In some examples, the navigation application may display a map showing one or more waypoints or other points of interest determined from the natural language input (e.g., historic churches, forests, etc.). In other examples, the navigation application may generate for display information specific to the natural language input. For instance, where the secondary goal is to travel along a route that allows for a high level of vehicle autonomy, a displayed map may be overlaid with the autonomy level corresponding to each segment of road.

FIGS. 2A-D illustrate a set of four candidate routes determined by a navigation application. In this example, the natural language input is provided by a user located in San Diego. The natural language input "take me to Oceanside on the coastal route, and I want to be arriving in less than 2 hours." The navigation application extracts the final destination (Oceanside), a qualifier (along the coastal route) and a constraint (arrive in less than 2 hours). The navigation application then generates a plurality of candidate routes shown in FIGS. 2A-2D, and ranks them based on all the extracted qualifiers and constraints. In this example, the time constraint causes the navigation application to eliminate any candidate routes that have an expected duration of two or more hours (e.g., eliminating the route shown in FIG. 2D). The navigation application also identifies a plurality of waypoints located in close proximity of the landmark the qualifier refers to (the coast). The navigation application ranks the remaining routes that meet the two-hour constraint based on the number of waypoints each route passes by. The navigation application then selects the highest ranked route to presentation via the user interface. In the illustrated example, the navigation application eliminates the route in FIG. 2D for failing to meet the constraint, and ranks the remaining routes in order 2C, 2A, and 2B. Route 2C is ranked highest because it passes by the most waypoints along the coast. Route 2A is second closest to the coast, and route 2B is furthest from the coast.

In some examples, the navigation application may enable a user to draw a desired route on a map. FIG. 3 illustrates this scenario. The navigation application may present a map via a user interface (e.g., a touch screen console of a vehicle), and enable a user to draw a desired route that he or she wishes to travel. The drawn route is shown as route 310 in FIG. 3. The drawn route may be freeform and not constrained by the navigation application to stick to only existing roads. The navigation application may analyze the drawn route 310 (e.g., by finding the road(s) closest to the drawn route 310) to determine a traversable route 320 that aligns with the drawn route 310, and/or maximizes the overlap between the drawn route 310 and existing roads. The navigation application may also analyze one or more waypoints or landmarks nearby the drawn route or traversable route (e.g., within a threshold distance) and may then identify a theme associated with the route. The theme may be a coastal route (as illustrated in FIG. 3), a route through the forest, a route that travels by historic churches, and more. The navigation application may then suggest another route separate from the drawn route and/or traversable route that better fits or passes by a greater number of waypoints or through more-relevant waypoints than the drawn route. This is shown as route 330, which passes closer to the coast. In some examples, the navigation application may also register the identified theme (e.g., coastal route) as a preference for the user and use it in subsequent recommendations for similar drawn routes.

In some examples, the navigation application may prompt the user for confirmation of a target route if more than one target route or no target route is found to meet the qualifiers and/or constraints of the natural language input. In connected examples, the navigation application may measure the satisfaction of the user with the route taken using various methods such as surveys (e.g., "how was your trip?") or emotion detection throughout the journey. In some examples, the navigation application may count the number of times or duration over which the user asks to stop or slow down in close proximity to a waypoint that was used to select the route in the first place. If the navigation application is a centralized service serving more than one vehicle and user, it may remember the user's natural language input and the associated target route as well as the user's satisfaction with the target route. The navigation application may then reuse the target route not only for the current user but also for other users that may request a similar route using similar natural language inputs. To compute route similarity, a navigation application may compute the level of overlap between two computed target routes. Input similarity may be obtained by comparing the language models' embedding vectors of two inputs using methods such as cosine similarity or Euclidian distance. In some examples, embeddings can be used to derive similarities or matches between a user's preferences and candidate points of interest enroute.

In some examples, the navigation application may inform the user of the selected target route and the reasons it was selected. If the user is satisfied with the selection, the vehicle may simply execute that route. However if the user is not satisfied, the navigation application may propose alternate target routes using the initial ranked list of candidate routes in decreasing ranking order until the user approves a route. For all these target routes, the navigation application may inform the user of the reason each target route was proposed. The user may interject and add more qualifiers and/or constraints at any time. Illustratively, in the example shown and described with respect to FIGS. 2A-D, when presented with route 2C, the user may make an additional natural language input such as "I want to go through Pacific Beach and La Jolla" or "I want to stop at the big white church we can see from the 5." In response, the navigation application may propose one or more new routes that take these new qualifiers into account. If these new directives lead to no target route that meets all the enunciated qualifiers and constraints, the navigation application may inform the user and propose an alternative that only meets a subset of the qualifiers and constraints. The navigation application may also propose and describe more than one target route and ask the user to select one.

In some examples, the navigation application may also remind or notify the user when the vehicle is approaching a waypoint or other point of interest used to determine the target route. For example, if a qualifier from the natural language input was to take PCH, then the navigation application may notify the user when the vehicle is about to get onto PCH (e.g., within a threshold distance from PCH).

In some examples, the vehicle may not have full autonomy (e.g., "Level 5" autonomous driving capabilities), or may not have full autonomy for the totality of the route. The navigation application may rank the various candidate routes according to its capabilities. Illustratively, the navigation application may infer from the natural language input that the user wants to just enjoy the ride. In this case, the navigation application may select a target route which maximizes the number of adjacent segments on which the vehicle can drive autonomously (i.e., level 5). In another example, the navigation application informs the user that certain segments of the target route will require the user to take control of the vehicle to a certain extent (i.e., level 2-4). The user may then decide to select another target route that may have less waypoints extracted from the original natural language input, but with more segments of road that allow for high level autonomy. For certain types of vehicles, the level of autonomy they can reach may be linked with the availability of a low-latency data network such as 5G or 6G. In these cases, the navigation application may access coverage maps to ensure that the autonomy levels required on the various segments of the target route are available. To decide the level of autonomy for a route segment, the navigation application may also use the presence of other vehicles driving on a segment and their associated reported autonomy levels to a centralized navigation monitoring network.

Figure 10:
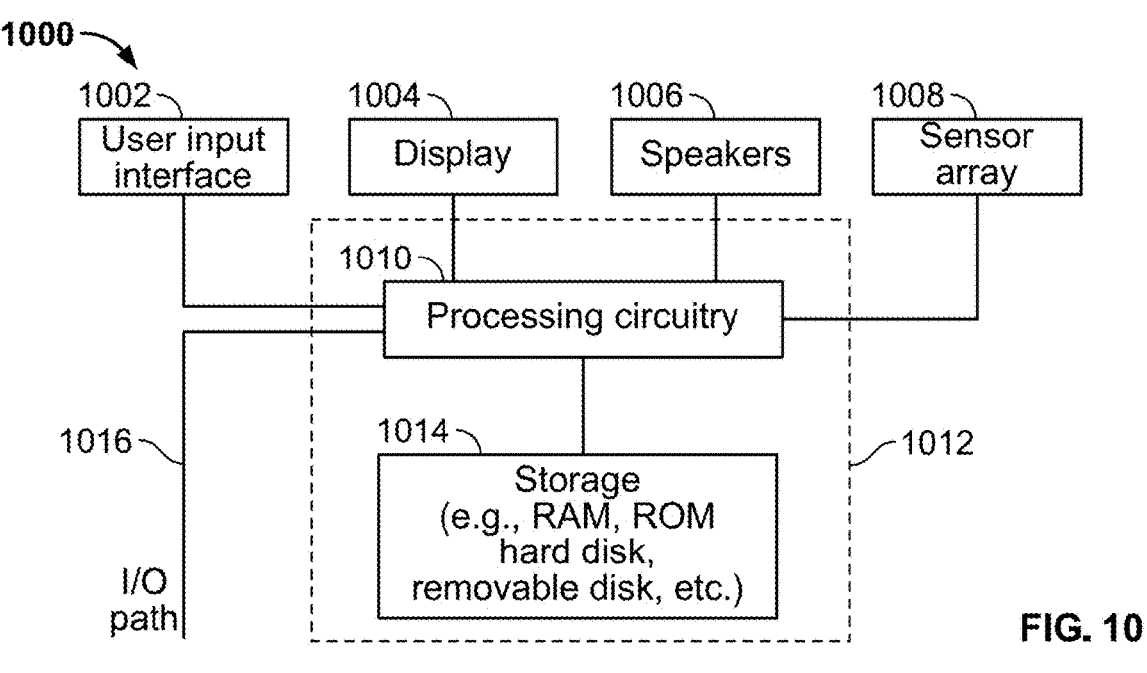
FIG. 10 illustrates a simplified block diagram of an example vehicle computing device, according to aspects of the present disclosure.

FIG. 4 illustrates an example process for extracting qualifiers and constraints from a natural language input to the navigation application, and determining a target route based on those extracted qualifiers and constraints. As shown in FIG. 4, in accordance with some embodiments, a process 400 may be executed by processing circuitry 1010 of a vehicle (FIG. 10). It should be noted that process 400 or any step thereof could be performed on, or provided by, the system of FIGS. 10 and 11. In addition, one or more steps of process 400 may be incorporated into or combined with one or more other steps described herein. For example, process 400 may be executed by control circuitry 1012 of FIG. 10 as instructed by a navigation application implemented running on the vehicle computing device 1000 in order to extract qualifiers and constraints and determine a target route. Also, one or more steps of process 400 may be incorporated into or combined with one or more steps of any other process or embodiment.

At step 402, the route selection process begins. At step 404, the navigation application receives a natural language input. As an example, the input may be a voice input via an AI assistant. Alternatively, the natural language input may be input manually, and may include a manual entering of text, destination, desired route parameters, etc. At step 406, the navigation application separates the destination, route qualifiers, and constraints. This may be done using any suitable natural language processing technique. As noted above, the qualifiers may correspond to desired aspects of the route, such as areas to prioritize (e.g., the coast, the forest), or points of interest that are desired (e.g., historic churches). Constraints may correspond to requirements that must be met, such as a duration of less than X minutes, or avoiding certain roads or areas.

At step 408, the navigation application determines a plurality of candidate routes from a current location or starting location to the input destination. This may include identifying all possible routes, all routes that do not include infinite loops or return to the start, or any other suitable route. These routes may be determined using any suitable path finding algorithm or technique.

At step 410, the navigation application extracts a first qualifier or constraint from the natural language input. This may be done using any suitable natural language processing technique. At step 412, the navigation application generates waypoints (if a qualifier was extracted) or constraints based on identified qualifier or constraint. As described above, this can include identifying a plurality of waypoints that correspond to the qualifier (i.e., historic churches). Where a constraint is extracted, this may include converting the extracted constraint into a rule that can be used to eliminate one or more candidate routes from consideration.

At step 414, the navigation application eliminates one or more candidate routes that do not meet the identified constraint. For example, if the constraint extracted is a maximum acceptable duration for the route, the navigation application at step 414 may eliminate all candidate routes that have an expected duration longer than the maximum acceptable duration. At step 416, the navigation application scores the remaining candidate routes based on the intersection of waypoints with each route. Candidate routes that pass by a greater number of waypoints are scored higher. Additionally, candidate routes that pass by more heavily weighted waypoints are scored higher as well.

At step 418, navigation application determines if there is another qualifier or constraint extracted from the natural language input that has not yet been evaluated. If there is another qualifier or constraint, process 400 proceeds back to repeat steps 412-418 to process the next qualifier or constraint. The navigation application iterates through all qualifiers and constraints in the natural language input. Once all the qualifiers and constraints have been evaluated, the process proceeds to step 420. At step 420, the navigation application ranks the remaining candidate routes that have not been eliminated, based on their corresponding scores.

And at step 422, the navigation application presents the highest ranked candidate route via a user interface. The process 400 may then optionally include receiving a confirmation of the selected route, and/or execution of the selected route. The process 400 may then end.

Figure 5:
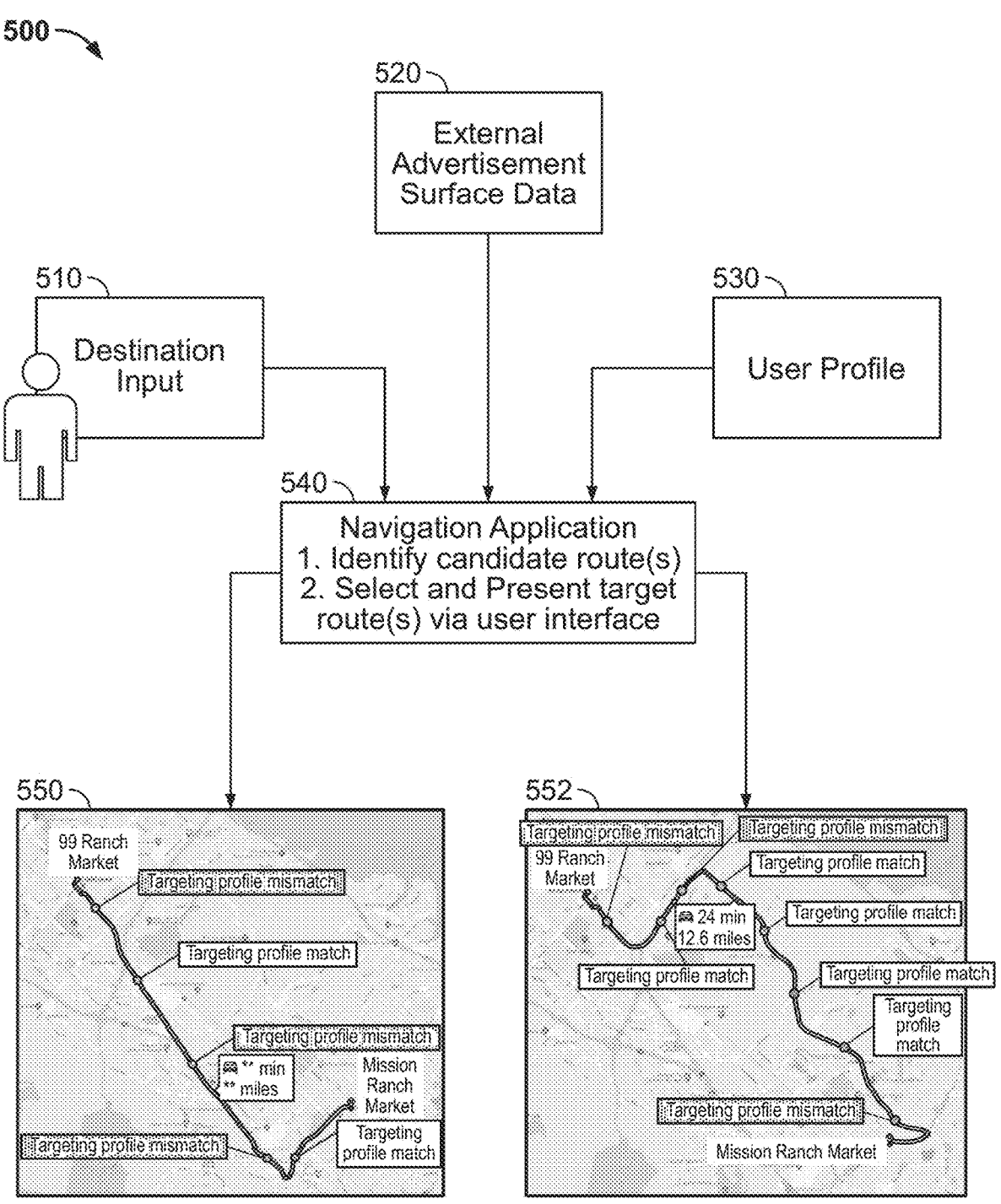
FIG. 5 illustrates an example scenario for determining candidate routes based on the locations of external advertisement surfaces, according to aspects of the present disclosure.

FIG. 5 illustrates a scenario 500 in which a navigation application 540 receives a destination input 510, external advertisement surface data 520, and user profile information 530, identifies a plurality of candidate routes to the destination, and selects and presents one or more target routes 550 and 552 via the user interface. This process enables the navigation application to maximize advertisement exposure for the user when guiding a vehicle on its route. In particular, examples disclosed herein enable a navigation application to determine a plurality of candidate routes for a vehicle (e.g., an autonomous vehicle or a rideshare vehicle) to travel from a starting location to an input destination. The navigation application is also configured to determine amongst the plurality of candidate routes, the target route that maximizes the exposure to external advertisement surfaces (e.g., dynamic and static billboards, store fronts, etc.) as well as the targeting needs expressed by these advertisement surfaces and the targeting profile of the occupants of the vehicle. The navigation application may also be configured to define when and what type of advertisement to display on external advertisement surfaces (e.g., billboards) along the target route, based on a plurality of vehicles and occupants being driven nearby or proximate to a given external advertisement surface. In some examples, the navigation application may be enabled to increase the impact of external advertisement surfaces by running linked digital campaigns inside the vehicle based on the proximity of the external advertisement surfaces.

Examples of the present disclosure may be useful for trips that are short, medium, or long. In some cases, the features disclosed herein may be useful for trips that are mid-range or long-range, and/or which may require a stop for food, lodging, or refueling, for example. These trips may be good candidates for optimizing the advertisements displayed. Additionally, the navigation application may use user profile information to carry out one or more functions described herein.

Billboards are a form of external advertisement surface that has not gone out of fashion despite their limited targeting and tracking capabilities. They are used everywhere, from rural America to New York's Times Square. Advertising on a billboard can be as cheap as a few hundred dollars a month in rural areas to tens of thousands of dollars a month in larger cities. Digital billboards are widespread in high traffic areas such as airports or malls and an ad spot on one of these can retail for a few tens of thousands of dollars a month. Despite the recurring cost, the lack of targeting, and the absence of impression guarantees, these external advertisement surfaces are still widely used.

Businesses that have a brick-and-mortar presence and/or a storefront have to spend money on all forms of advertisement to drive customers to their stores. Billboards strategically placed before a user reaches the store are a relatively cheap way to advertise one's business when competition is low. When competition is high, placing billboards for each store could result in a multiplication of billboards, a dilution of the driver's attention, and an overall low impact of each advertisement. Store owners may team up to keep the number of billboards low and alternate their advertisements in the hope that customers drawn by one business' billboard may end up visiting other businesses in the same general area.

Embodiments of the present disclosure provide techniques for optimizing external advertisement surface exposure for users planning and traveling along routes to their desired destinations. In one example, a navigation application receives a destination, and determines a plurality of candidate routes from a starting location to that destination. The navigation application then determines a target route from the plurality of candidate routes, based on the locations of a plurality of external advertisement surfaces (e.g., billboards and storefront advertisements). The navigation application determines the target route by ranking the plurality of candidate routes based on how many external advertisement surfaces are positioned along each route. In some examples, the navigation application may employ a cost function in determining the target route. The cost function may factor in the expected time to reach the destination, the operating cost, and the number of external advertisement surfaces positioned along each route. The cost function may also consider the user profile, and the preferences contained therein to identify a relevance value associated with each external advertisement surface (and/or the advertisements displayed on each surface). More relevant advertisements may be ranked higher than less relevant advertisements. In some examples, the navigation application may register impressions automatically when the vehicle passes an external advertisement surface. This may be done using an internal camera or image sensor to detect which occupant looked at the external advertisement surface. In some examples, the navigation application may also cause display of advertisements on an internal vehicle display, which may correspond to the advertisement displayed on the external advertisement surface. In other examples, the navigation application may operate using vehicle-to-infrastructure (V2I) and/or vehicle-to-everything (V2X) technology to register impressions.

Referring back to FIG. 5, the navigation application may receive information about external advertisement surfaces (e.g., the location, the currently displayed advertisement, other possible advertisements that may be displayed, timing information about when the advertisements will be displayed, targeting information or demographic information corresponding to each advertisement, etc.). In some examples, the navigation application may receive this information about external advertisement surfaces that are a part of a network or have bought into the service described herein.

The navigation application may determine a desired destination based on user input. As with the embodiments described above, the user input may be in natural language, may be spoken, may be input via text, may be received from a secondary device or third party, or may be input via any other suitable user interface element or format. The navigation application may also receive or determine a starting location, such as by receiving the starting location as user input (e.g., spoken or text input), or by automatically determining the starting location based on a location of the vehicle, smartphone, or other device from which the user input was received.

The navigation application may have primary goal of determining a traversable route from the starting location to the input destination. The navigation application may have secondary goal of maximizing the number of external advertisement surfaces visible from the traversable route, and even more specifically maximizing the number of external advertisement surfaces that are relevant to the user(s) travelling to the destination. Similar to the embodiments discussed above, the navigation application may determine a plurality of candidate routes from the starting location to the destination. The navigation application may then select a target route from the plurality of candidate routes such that the target route maximizes the number, relevance, and/or other value corresponding to the external advertising surfaces visible to occupants of the vehicle when traversing the target route.

Figure 6A:
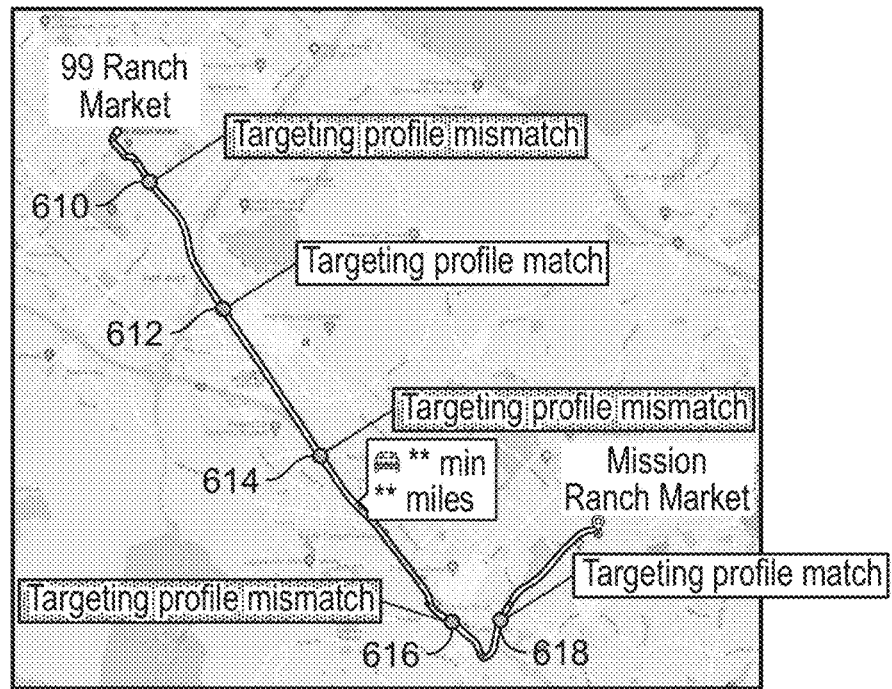
FIGS. 6A-B illustrate two example candidate routes illustrating the locations of different numbers of relevant external advertisement surfaces based on a user profile, according to aspects of the present disclosure.
Figure 6B:
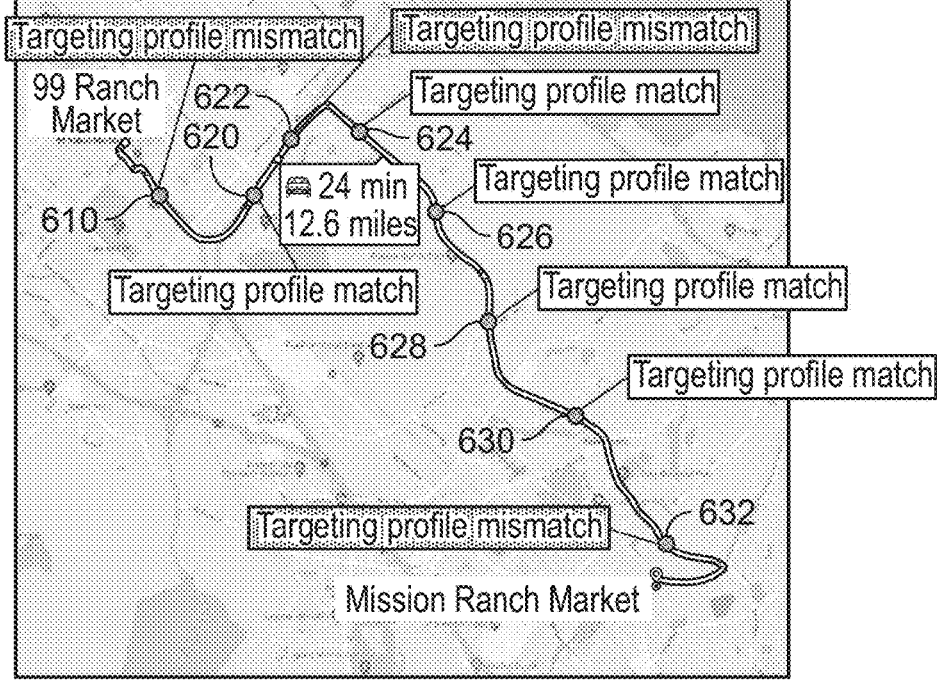

FIGS. 6A and 6B illustrate two example candidate routes determined by the navigation application when travelling from a starting location to a destination. The first candidate route, shown in FIG. 6A, includes five external advertisement surfaces 610, 612, 614, 616, and 618 along the route. The second candidate route, shown in FIG. 6B, includes eight external advertisement surfaces 610, 620, 622, 624, 626, 628, 630, and 620 along the route. Note that both candidate routes share external advertisement surface 610. Note also that the expected duration of each route may be the same, or may be within a threshold of each other (e.g., less than one minute difference, less than x % of the shortest route duration, etc.). Further, note that for the first candidate route, external advertisement surfaces 610, 614, and 616 are deemed not relevant to the user, while external advertisement surfaces 612 and 618 are deemed relevant. Similarly, with respect to the second candidate route, external advertisement surfaces 610, 622, and 632 are deemed not relevant to the user, while external advertisement surfaces 620, 624, 628, and 630 are deemed relevant. The navigation application may determine the relevance of the external advertisement surfaces based on whether the advertisement(s) displayed by each external advertisement surface matches demographic information of the user in the user profile, and/or whether the user profile includes preferences or interests that align with the advertisement. In some cases, each external advertisement surface may be ranked according to the relevance of the displayed advertisement to the user or users.

After determining the two candidate routes shown in FIGS. 6A and 6B, the navigation application may identify a target route from among these candidate routes. The target route may be determined based on a cost function that takes into account the user's profile and/or other occupant profiles (e.g., likes, dislikes, past trips, images in photo albums, transactions, etc.) as well as the audience targeted by each advertisement of the external advertisement surfaces along each candidate route. In some examples, the cost function may weight advertisements based on relevance to one or more users traveling in the vehicle, and select the candidate route having the set of external advertisement surfaces which has the highest total weighted value. Additionally, the cost function may be tailored to steer users with similar profiles to the same external advertisement surfaces.

In some examples, one or more external advertisement surfaces may be configured to change the displayed advertisement at regular intervals, or on demand. The navigation application may factor these changes into the cost function to determine which candidate route is best, both on an individual basis for a single trip, and at a larger scale when considering multiple trips and users. For example, when considering a plurality of candidate routes for a single trip, the navigation application may consider which external advertisement surfaces have ads which may change to a relevant advertisement by the time the vehicle arrives nearby the external advertisement surface. Thus, while a currently displayed advertisement may not currently be relevant to the use (and may thus be weighted lower), by the time the vehicle approaches the external advertisement surface the ad may have changed to a more relevant advertisement. In this case, the cost function may consider the more relevant advertisement and weight that external advertisement surface higher, even if the current ad is not relevant.

Additionally, at a larger scale when considering multiple users requesting rides to multiple destinations, a centralized planner navigation application may consider the user profiles of multiple users when determining the target route for each individual user. For example, the navigation application may determine that a first external advertisement surface may display a first advertisement or a second advertisement, wherein each advertisement is relevant to only a subset of the users. The navigation application may instruct the external advertisement surface to display the first advertisement, and also cause the subset for which the first advertisement is relevant to travel along a route that passes by that external advertisement surface. In this way, the navigation application may optimize the routes of all users simultaneously, or over time, such that the overall relevance of advertisements displayed to users is increased. In another illustrative example, a given external advertisement surface may change the displayed advertisement every ten minutes. Using this information about when each advertisement will be displayed, and the targeting profile and/or demographics of users to whom the displayed advertisements are relevant, the navigation application can plan routes and/or weight the external advertisement surface based on the expected advertisement that will be displayed at the time each user travels by the external advertisement surface. The navigation application can prioritize routing or steering a first type of user with profiles matching a first advertisement along routes past the external advertisement surface for the time period when the first advertisement is displayed (such that the first type of user passes by the external advertisement surface during the ten minute window when the first advertisement is displayed), and then switch to routing a second type of user with profiles matching a second advertisement along routes past the external advertisement surface for a subsequent time period after the external advertisement surface has switched from the first advertisement to the second advertisement (such that the second type of user passes by the external advertisement surface during the ten minute window when the second advertisement is displayed).

Referring back to FIGS. 6A and 6B, the navigation application may select the candidate route shown in FIG. 6B as the target route. The cost function may indicate that route 6B includes five external advertisement surfaces that are relevant to the user, while route 6A includes only two relevant external advertisement surfaces.

In some examples, the navigation application may determine a single target route from among the plurality of candidate routes, and may present the target route via a user interface. In other examples, the navigation application may rank the plurality of candidate routes based on one or more factors, such as expected duration, number of external advertisement surfaces along the route, etc. The navigation application may present one or more of the identified candidate routes to the user (e.g., the top ranked candidate route), and may prompt the user for confirmation of the selected route. Additionally or alternatively, the navigation application may cause the vehicle to traverse the selected route.

In some examples, the navigation application may enable presentation of multiple candidate routes and enable the user to select a route. For example, the navigation application may identify a first target route that has the shortest expected duration, and a second target route that has a longer expected duration but passes by a greater number of relevant external advertisement surfaces. The user may be presented with an option to take the longer route, but with a reduced cost of the trip. For instance, in a rideshare context, the user may opt to take the longer route and pay a reduced fee, or to take the shorter route and pay a higher fee. Similarly, in a different context, a user may be paid a small fee for opting to take a longer route that passes by a larger number of external advertisement surfaces, even if not in a rideshare context. The navigation application may identify multiple candidate routes, and may prompt the user to select a route by providing additional information about the fee that may be earned by taking one route over the others. In some examples, the navigation application may prompt the user by outputting audio or text that indicates a question "do you want to change your route to X?" or "do you want to change your destination to X?"

In some examples, it may be beneficial to register impressions for one or more of the users. This impression data may be valuable to advertisers, and may be a key component of ensuring the cost function operates properly by enabling advertisers to pay for views of their advertisements. In an example, the navigation application registers an impression for each of the users and/or vehicle occupants when the vehicle drives in proximity to an external advertisement surface (e.g., billboard or storefront) that participates in the network. The network may be a group of businesses and advertisers that want their external advertising surfaces to be included in the cost function used by the navigation system to determine the target route. In some cases, the vehicle may be fitted with one or more sensors to detect whether the vehicle occupants were actually looking at the external advertisement surface and register a confirmed impression if so.

Figure 7A:
FIGS. 7A-B illustrate coordination between an external advertisement surface and an internal vehicle display, according to aspects of the present disclosure.
Figure 7B:

In a related example, the navigation application may be configured to display an advertisement on an in-vehicle display (e.g., on a center console, on a window, audibly, etc.) corresponding to the advertisement on the external advertisement surface. This may be useful in circumstances where the user did not view the external advertisement surface and no impression was registered. FIGS. 7A and 7B illustrate, respectively, an external advertisement surface displaying a first advertisement, and an in-vehicle display showing a second advertisement corresponding to the first advertisement.

In some examples, one or more external advertisement surfaces may be configured to communicate with the navigation system and/or the vehicle(s) passing by, in order to receive impression data indicating that users have viewed the advertisements. Additionally, in some examples, the target route and vehicle occupant profiles may be transferred to one or more external advertisement surfaces along the target route with an estimated time of arrival (ETA) in proximity of each surface. External advertisement surfaces may be part of a participant network, wherein the owner of the external advertisement surface elects to join the network, and have his or her external advertisement surface added to a set of participating surfaces. Embodiments of the present disclosure may operate using only those participating surfaces. The external advertisement surfaces in the participant network may thereby receive a plurality of ETAs and vehicle occupants' profiles from a plurality of vehicles traveling intersecting routes. The network of participant external advertisement surfaces then determines the optimal advertisement content to display for each of the external advertisement surfaces using a cost function of the available content at each external advertisement surface (which may be limited for static billboards or mechanically revolving content billboards), the target audience for each advertisement at each external advertisement surface, and the window of exposure of each cluster of vehicles and their occupants (e.g., based on traffic speed between the time the surface comes into view and the actual surface location).

In some examples, when the vehicle arrives in close proximity of a network participant external advertisement surface, the navigation application may communicate with the in-vehicle infotainment system to then reinforce the message of the external advertisement surface or direct the occupant's attention to the external advertisement surface using in-vehicle screens or augmented reality (AR) surfaces. Optionally, this companion advertisement may be sent by the participant network or the external advertisement surfaces themselves. In addition, this companion advertisement may also be sent to one or more user's personal device such as smartphone, tablet, or AR device, either directly over the air or via the infotainment system if paired. In a connected example, the vehicle's surrounding sensors such as cameras and LIDAR may inform the navigation application that the upcoming external advertisement surface (e.g., billboard, storefront, etc.) may be blocked from view for certain vehicle occupants due, for example, to the presence of an obstacle such as a truck or overgrown vegetation. Other blockage may be weather related such as the presence of dense fog or heavy rain. In the case where an external advertisement surface is blocked from view for one or more vehicle occupants, the navigation application may request a different advertisement from the participant network to display on the in-vehicle display (e.g., AR surfaces or regular screens). The connection between advertisements displayed on an external advertisement surface and an in-vehicle display are illustrated in FIGS. 7A-B. In a connected example, the participant advertisement network or each of the external advertisement surfaces may select a different companion ad for each of the vehicle occupants according to their individual profiles. The companion ads may be sent to the navigation application for display via one or more displays of the vehicle, and/or via each participant's personal device.

Figure 8:
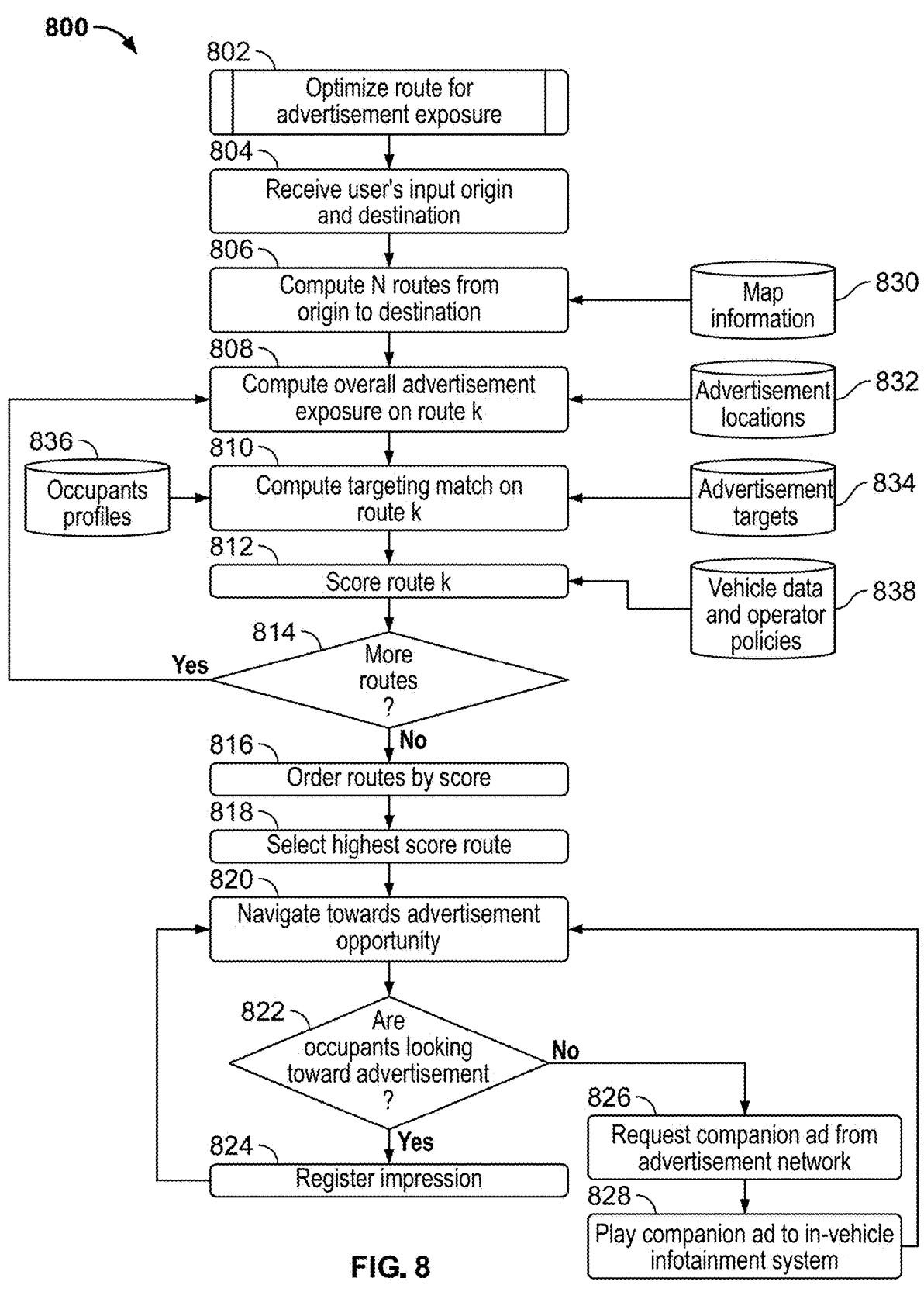
FIG. 8 illustrates an example process of route optimization to maximize external advertisement surface exposure, according to aspects of the present disclosure.

FIG. 8 illustrates an example process 800 for route optimization to maximize relevant advertisement exposure. As shown in FIG. 8, in accordance with some embodiments, a process 800 may be executed by processing circuitry 1010 of a vehicle (FIG. 10). It should be noted that process 800 or any step thereof could be performed on, or provided by, the system of FIGS. 10 and 11. In addition, one or more steps of process 800 may be incorporated into or combined with one or more other steps described herein. For example, process 800 may be executed by control circuitry 1012 of FIG. 10 as instructed by a navigation application implemented running on the vehicle computing device 1000 in order to determine a target route. Also, one or more steps of process 800 may be incorporated into or combined with one or more steps of any other process or embodiment.

The process 800 begins at step 802. At step 804, the navigation application receives a starting location and a destination. The starting position and destination may be input using any suitable means, including via speech or text input. In some examples, the navigation application may automatically determine the starting location based on the location of the navigation system itself, and/or the location of a device used to make the input such as a smartphone or other device.

At step 806, the navigation application determines a plurality of candidate routes from the starting location to the destination. The candidate routes may be determined using any suitable path finding technique, or other method of analysis, similar to the descriptions above. The navigation application may retrieve map information from the map information source 830, and may use this information to determine the plurality of candidate routes.

At step 808, the navigation application determines the overall advertisement exposure for a first route "k" of the plurality of candidate routes. This may include retrieving data corresponding to external advertisement surface locations from the advertisement location data source 832. The navigation application may identify a number of external advertisement surfaces present along the route k, which are visible from the route k, and/or that are within a threshold distance from the route k. Other methods of analysis are possible as well.

At step 810, the navigation application determines a targeting match for route k between the advertisements displayed by the external advertisement surfaces along route k and the user profile of the user and other occupants. The navigation application may retrieve profile information about the user and occupants from the profile storage 836, as well as retrieving advertisement information from the advertisement target storage 834. The navigation application may determine whether one or more of the advertisements displayed by the external advertisement surfaces along the route k match with the profile of the vehicle occupants. That is, the navigation application determines whether one or more of the occupants is the target audience for the advertisements of each external advertisement surface along the route k.

At step 812, the navigation application scores the route k. This can include retrieving information about the vehicle data and operator policies which may be used to inform whether the route k is acceptable or not, and how it should be scored. In some examples, the vehicle data and operator policies may dictate the rules regarding which routes are allowed or not, how to score a route, how to weight certain factors when calculating the score, etc.

At step 814, the navigation application determines whether there are additional candidate routes that need to be analyzed (e.g., route k+1, k+2, etc.). If there are additional candidate routes to analyze, the process proceeds back to step 808, and repeats steps 808-814 for each candidate route. When no more candidate routes are left, and each candidate route has been scored at step 812, the process proceeds to step 816.

At step 816, the navigation application orders the candidate routes based on the determined scores. This may include ranking the candidate routes on a list or other data structure. And at step 818, the navigation application selects the highest sored route for execution. In this context, execution may include causing an autonomous vehicle to travel along the route. It may also or alternatively include displaying turn-by-turn instructions to assist a user in navigating the vehicle along the selected route.

At step 820, the navigation application determines that the vehicle is navigating towards a first external advertisement surface. This may be done by comparing a location of the vehicle to the location of the external advertisement surface, and determining that the vehicle location is within a threshold distance of the external advertisement surface, or that the external advertisement surface is within view for an occupant of the vehicle.

At step 822, the navigation application determines whether any occupants of the vehicle are looking toward the external advertisement surface. As noted above, this may be done using a camera, image sensor, or other sensor(s) within the vehicle to identify the viewing direction of the occupants of the vehicle. If the navigation application determines that one or more occupants of the vehicle are looking towards the direction of the external advertisement surface, the navigation application may register an impression at step 824.

However, if the navigation application determines that the occupants are not looking toward the external advertisement surface, the navigation application may request a companion advertisement from the advertisement network (e.g., a network associated with the external advertisement surface) at step 826. The navigation application may then receive the companion advertisement from the external advertisement surface, from a server, of from some other source, and may cause the companion advertisement to be displayed on an in-vehicle display (e.g., center console, AR display, etc.) at step 828. It should be appreciated that in some examples, the companion advertisement may be transmitted from the advertisement network regardless of whether the occupants are looking toward the external advertisement surface or not. The process may proceed back to step 820 to wait for the vehicle to approach the next external advertisement surface along the target route. The process 800 may continue to execute steps 820-828 for each additional external advertisement surface along the target route. The process 800 may then end when the vehicle reaches the destination.

Figure 9:
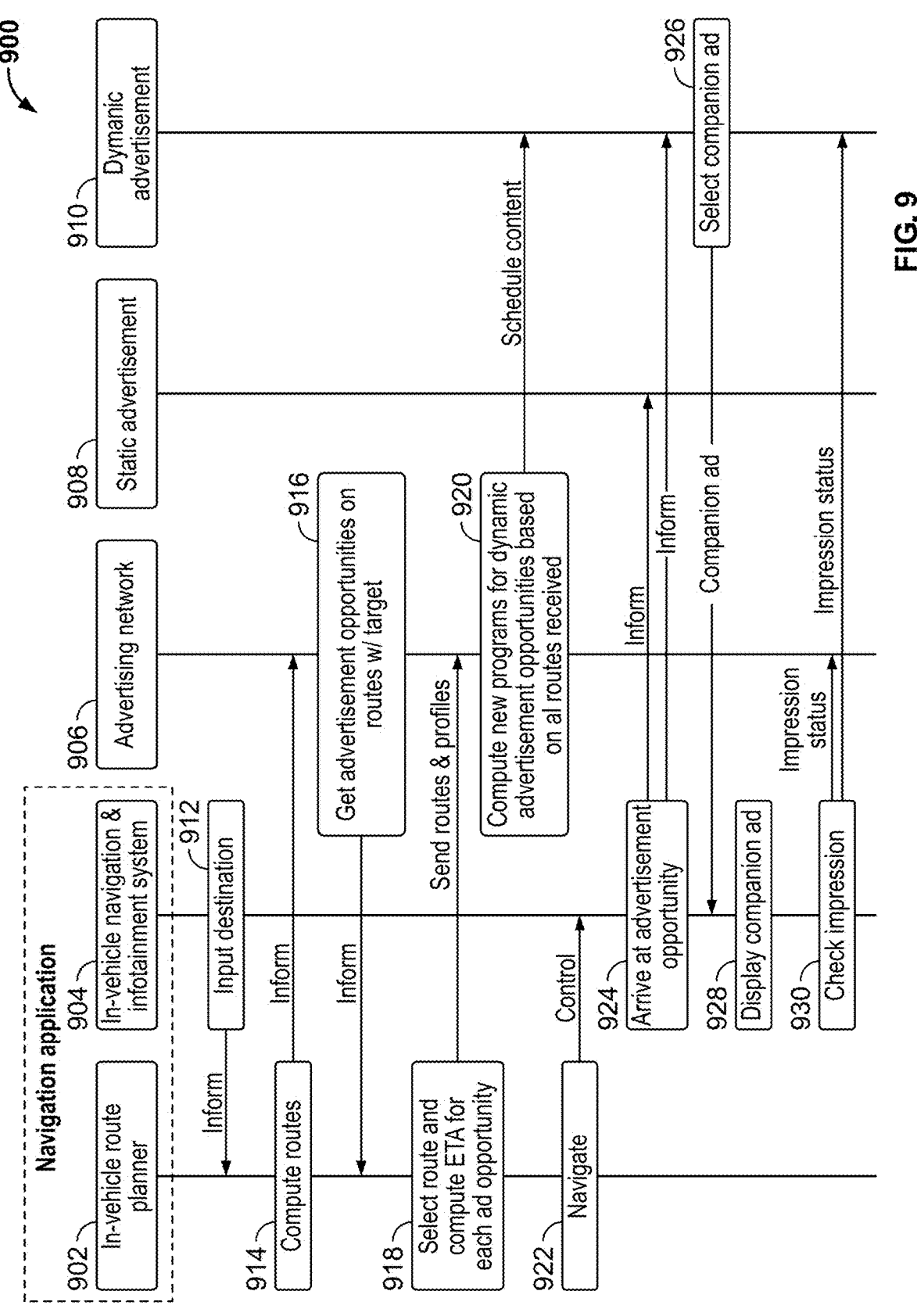
FIG. 9 illustrates an example timing diagram for route optimization to maximize external advertisement surface exposure, according to aspects of the present disclosure.

FIG. 9 illustrates an example timing sequence diagram 900 for route optimization to maximize relevant advertisement exposure according to one embodiment. In this example, the sequence 900 may be executed by various parts of the overall system, including the in-vehicle route planner 902 and in-vehicle navigation and infotainment system 904 (collectively the navigation application), the advertising network 906, the static advertisement 908 (e.g., a first type of external advertisement surface), and the dynamic advertisement 910 (e.g., a second type of external advertisement surface).

At step 912, the sequence includes receiving an input destination at the in-vehicle navigation and infotainment system 904. The destination is passed to the in-vehicle route planner, which identifies one or more candidate routes at step 914. Information regarding the candidate routes is then passes to the advertising network, which retrieves information regarding external advertisement surfaces that are present along each of the candidate routes at step 916. This may include retrieving information about all possible advertisements, and/or only those advertisements that are relevant to the users or occupants of the vehicle. This data is then transmitted back to the in-vehicle route planner 902.

At step 918, the in-vehicle route planner selects a target route from the candidate routes based on the advertising information provided by the advertising network 906 at step 916. The in-vehicle route planner determines an estimated time of arrival for each external advertisement surface along the target route, and transmits the target route and user profile information to the advertising network.

The advertising network 906 may receive target routes and/or profile information from a large number of vehicles, and may use this information to determine optimal advertisements to display based on the collective routes and user profiles of all users from which it has received information. At step 920, the advertising network determines a program for dynamic advertisements displayed on various external advertisement surfaces based on all the received data. The advertising network 906 then transmits the new schedule of advertisements to display to any external advertisement surfaces that can dynamically change the displayed advertisement (e.g., dynamic advertisement surface 910).

At step 924, the in-vehicle navigation and infotainment system 904 determines that the vehicle is approaching an external advertisement surface as the vehicle travels along the target route. The system 904 informs the external advertisement surface (e.g., either the static surface 908 or the dynamic surface 910 depending on the type of external advertisement surface). If the in-vehicle system 904 determines that the vehicle occupants are not viewing the external advertisement surface, and the external advertisement surface is a dynamic advertisement surface capable of communication with the vehicle, the vehicle system 904 may inform the dynamic advertisement display 910 that no impression was registered. The dynamic advertisement display 910 may then select a companion advertisement at step 926, and transmit that companion advertisement back to the vehicle system. In some examples, the companion advertisement may be transmitted only if the in-vehicle system 904 determines that the vehicle occupants were not viewing the external advertisement surface. In other examples, the companion advertisement may be transmitted regardless of whether the in-vehicle system 904 determines that the vehicle occupants were not viewing the external advertisement surface.

At step 928, the vehicle system 904 may receive the companion advertisement, and may cause an in-vehicle display to present the companion advertisement to the vehicle occupant(s). The vehicle system 904 may then determine whether the occupant has viewed the companion advertisement, and if so, may register an impression for that advertisement at step 930. The process 900 may then continue as the vehicle travels along the target route and approaches the next external advertisement surface. Steps 922-930 may be repeated for each additional external advertisement surface along the target route.

In some examples, a centralized navigation application or navigation system may be used to select the target route for one or more vehicles. The centralized navigation application may function to enable brick-and-mortar businesses to buy advertisements for their businesses that consist of nudging or directing self-driving vehicles or planning target routes for human drive vehicles to take along routes that intersect with their places of business. Such a business may be referred to as a participant business. When a vehicle requests navigation guidance to go from a starting location to a destination, the navigation application may identify a plurality of candidate routes as described above, taking into account distance, refueling options, tolls, time to destination based on traffic data . . . etc. The navigation application may then determine the presence of participant businesses on these routes, and rank the routes using a cost function taking into account the time to destination, the operational cost of the vehicle on each route and the number of participant businesses along these routes. The navigation application may then determine an ordered list of candidate routes, and may select the highest ranking route to present via a user interface.

In some examples, the cost function noted above takes into account the vehicle occupant's profiles, the target customer profile of each participant business along the candidate routes, and the associated likelihood that one of the vehicles occupants will convert into a customer to each of these businesses. In other examples, the navigation application may register a conversion for each of the occupants that exits the vehicle when the vehicle stops in proximity of a participant business. In still other examples, the participant businesses are fitted with V2X technology that allows the businesses to receive information from passing vehicles, to help the businesses determine the efficiency of their advertisements (i.e., by counting stopped vehicles as conversion and passing by vehicles as missed conversion) and similarly informs a vehicle or other entities of a successful conversion.

In some examples, the navigation application may consider mandatory stops (such as for recharging or refueling stops, bathroom breaks, food, etc.) and their durations to route a vehicle and its occupants to a location where ancillary revenue generation can be maximized. Illustratively, a vehicle fleet operator may have an agreement with a network of recharging businesses that, in addition to charging vehicles, sell a variety of brands at a corresponding convenience store. The navigation application may take that information, along with the profiles of the vehicle occupants, and may elect to advertise for the brands in the corresponding convenience store prior to reaching the charging destination. Additionally, the navigation application may route a vehicle to a station that carries brands compatible with the vehicle occupants' profiles. A navigation application may also propose revenue-generating activities while waiting for the vehicle to be re-charged based on occupants' preferences, and available business opportunities. For example, the navigation application may offer short form videos to rent on the vehicles infotainment system or the occupants' mobile devices, or may advertise for revenue-generating activities available at businesses at the charging station such as bars, restaurants, massage parlors, and others, prior to reaching the charging station or while the vehicle is charging.

Some examples described herein are discussed with respect to a single vehicle, and determination of a target route for that vehicle without regard for routes determined for other vehicles. In some examples, such as for a fleet operator, it may be beneficial to determine target routes for multiple vehicles, wherein a target route for a first vehicle is determined based at least in part on the target route(s) determined for one or more other vehicles. That is, a fleet operator may optimize target route determination such that a plurality of vehicles are all routed with the other vehicles' routes factored in. In one example, each of a plurality of vehicles may have a starting location, desired destination, and associated user profile. The navigation application operating to determine the target routes for each of the plurality of vehicles (which may be referred to as a fleet navigation application) may determine a plurality of candidate routes for each of the plurality of vehicles. The fleet navigation application may also determine a respective target route for each of the plurality of vehicles based on (1) the respective starting location, (2) the respective destination, (3) the location of the plurality of external advertisement surfaces, (4) the targeting requirements corresponding to one or more of the plurality of external advertisement surfaces (e.g., the target audience for each advertisement), (5) the expected time of arrival at one or more of the plurality of external advertisement surfaces for each of the plurality of vehicles, and (6) the user profile associated with each of the plurality of vehicles. The fleet navigation application may use all of this information to optimize the target routes for all of the vehicles, such that as a whole, the exposure of the occupants of the vehicles to the plurality of external advertisement surfaces is optimized. That is, while each vehicle's target route may not individually maximize the occupants' exposure to the most relevant external advertisement surfaces, as a collective or as a whole, the combined exposure of all of the vehicle occupants to the relevant external advertisement surfaces is maximized. For instance, in a scenario with 100 vehicles in the fleet, taking each vehicle in isolation, the fleet navigation application may determine 100 respective target routes, that take each respective vehicle past an average of 10 billboards with average relevance to the occupants of each vehicle. However, if the candidate routes and/or target route of all of the 100 vehicles in the fleet are taken into account, the additional information regarding (1) traffic conditions, (2) position of vehicles over time (based on the known routes of the 100 vehicles), (3) the user profiles, (4) targeting profiles of the advertisements, etc., may enable the fleet navigation application to better optimize the collective set of target routes. The fleet navigation application may instead determine a more optimal set of target routes that enable each target route to take the respective vehicle past an average of 12 relevant billboards (i.e., an increase of 20%) without sacrificing trip duration. Or alternatively, the fleet navigation application may determine a more optimal set of target routes that enable each target route to take the respective vehicle past billboards that have more relevance to the respective vehicle occupants (e.g., an average of 10 billboards with high relevance), again without sacrificing trip duration.

FIG. 10 depicts example devices and related hardware for enabling a navigation application to incorporate a vehicle occupant's preferences along with natural language input to identify a target route, and to enable a navigation application to maximize exposure of vehicle occupants to external advertisement surfaces, in accordance with some embodiments of the disclosure. FIG. 10 shows a generalized embodiment of illustrative vehicle computing device 1000. Vehicle computing device 1000 may receive data via input/output (I/O) path 1016, and may process input data and output data using input/output circuitry (not shown). I/O path 1016 may provide content (e.g., advertisement information, user profile information, broadcast programming, on-demand programming, Internet content, content available over a local area network (LAN) or wide area network (WAN), and/or other content) and data to control circuitry 1012, which includes processing circuitry 1010 and storage 1014. Control circuitry 1012 may be used to send and receive commands, requests, and other suitable data using I/O path 1016.

Control circuitry 1012 may be based on any suitable processing circuitry such as processing circuitry 1010. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units. In some embodiments, control circuitry 1012 executes instructions for a vehicle navigation application stored in non-volatile memory (i.e., storage 1014). Specifically, control circuitry 1012 may be instructed by the navigation application to perform the functions discussed in this disclosure. For example, the navigation application may provide instructions to control circuitry 1012 to identify occupants of the vehicle, and/or to provide information via the vehicle user interface 1002. In some implementations, any action performed by control circuitry 1012 may be based on instructions received from the navigation application.

In client/server-based embodiments, control circuitry 1012 may include communications circuitry suitable for communicating with an application server or other networks or servers. The instructions for carrying out the above-mentioned functionality may be stored on the application server. Communications circuitry may include SATCOM, a 5G or 6G modem, a cable modem, an integrated-services digital network (ISDN) modem, a digital subscriber line (DSL) modem, a telephone modem, Ethernet card, a wireless modem, and/or one or more CAN busses or Ethernet transceivers for communications with other equipment, or any other suitable communications circuitry. Such communications may involve the Internet or any other suitable communications networks or paths (which are described in more detail in connection with FIG. 11). In some embodiments, a sensor array 1008 is provided in the vehicle computing device 1000. The sensor array 1008 may be used for capturing image data, audio data, RF data, and/or any other data described herein, generating various data, and making various determinations and identifications as discussed in this disclosure. The sensor array 1008 may include various sensors, such as one or more cameras, microphones, ultrasonic sensors, RF sensors, LIDAR, and light sensors, for example. The sensor array 1008 may also include sensor circuitry which enables the sensors to operate and receive and transmit data to and from the control circuitry 1012 and various other components of the vehicle computing device 1000. In addition, communications circuitry may include circuitry that enables peer-to-peer communication of user equipment devices, or communication of user equipment devices in locations remote from each other (described in more detail below).

Memory may be an electronic storage device provided as storage 1014 that is part of control circuitry 1012. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1014 may be used to store various types of content described herein as well as content data and application data that are described above. Nonvolatile memory may also be used (e.g., to launch a boot-up routine and other instructions). Cloud-based storage may be used to supplement storage 1014 or instead of storage 1014.

Control circuitry 1012 may include video generating circuitry and tuning circuitry, such as one or more analog tuners, one or more decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 1012 may also include scaler circuitry for upconverting and down-converting content into the preferred output format of the user equipment device 1000. Sensor array 1008 and/or control circuitry 1012 may also include digital-to-analog converter circuitry and analog-to-digital converter circuitry for converting between digital and analog signals. The tuning and encoding circuitry may be used by the vehicle computing device to receive and to display, play, or record content. In some embodiments, the control circuitry may include an HD antenna.

In one embodiment, speakers 1006 may be provided as integrated with other elements of vehicle computing device 1000 or may be stand-alone units. The audio and other content displayed on display 1004 may be played through speakers 1006. In some embodiments, the audio may be distributed to a receiver (not shown), which processes and outputs the audio via speakers 1006.

In some embodiments, the sensor array 1008 is provided in the vehicle computing device 1000. The sensor array 1008 may be used to monitor, identify, and/or determine the identity of the occupant(s) interacting with the vehicle user interface 1002. For example, the vehicle interface application may receive image data from the sensor array (e.g., cameras) that are used to identify which occupant is making a control input to the vehicle user interface 1002.

The navigation application may be implemented using any suitable architecture. For example, it may be a stand-alone application wholly implemented on vehicle computing device 1000. In such an approach, instructions of the navigation application are stored locally (e.g., in storage 1014), and data for use by the navigation application is downloaded on a periodic basis (e.g., from an out-of-band feed, from an Internet resource, or using another suitable approach). Control circuitry 1012 may retrieve instructions of the application from storage 1014 and process the instructions to carry out any of the functions discussed herein. Based on the processed instructions, control circuitry 1012 may determine what action to perform when input is received from input interface 1002. For example, the movement of a cursor on an audio user interface element may be indicated by the processed instructions when input interface 1002 indicates that a user interface 1002 was selected. In some examples, a vehicle may include multiple electronic control units (ECUs) used in conjunction to achieve one or more functions. For example, the sensor array 1008 may be fitted with its own processing circuitry (similar to processing circuitry 1010) and storage (similar to storage 1014) and may communicate via an input/output path (similar to I/O path 1016) to another processing circuitry and/or storage. Similarly, display 1004 and UI 1002 may be connected to another processing circuitry and/or storage. This architecture enables various components to be separated, and may segregate functions to provide failure separation and redundancy.

In some embodiments, the navigation application is a client/server-based application. Data for use by a thick or thin client implemented on vehicle computing device 1000 is retrieved on-demand by issuing requests to a server remote to the vehicle computing device 1000. In one example of a client/server-based application, control circuitry 1012 runs a web browser that interprets web pages provided by a remote or edge server. For example, the remote server may store the instructions for the application in a storage device. The remote server may process the stored instructions using circuitry (e.g., control circuitry 1012) and carry out one or more of the functions discussed herein. The client device may receive data from the remote server and may also carry out one or more of the functions discussed herein locally on vehicle computing device 1000. This way, the processing of the instructions is performed at least partially remotely by the server while other functions are executed locally on vehicle computing device 1000. Vehicle computing device 1000 may receive inputs from the user or occupant of the vehicle via input interface 1002 and transmit those inputs to the remote server for processing. For example, vehicle computing device 1000 may transmit, via one or more antenna, communication to the remote server, indicating that a user interface element was selected via input interface 1002. The remote server may process instructions in accordance with that input and generate a display of content identifiers associated with the selected user interface element. The generated display is then transmitted to vehicle computing device 1000 for presentation to the user or occupant of the vehicle.

In some embodiments, the navigation application is downloaded and interpreted or otherwise run by an interpreter or virtual machine (run by control circuitry 1012). The navigation application may operate in connection with or as a part of an electronic control unit (ECU) of a vehicle. The ECU may be one of many ECUs of the vehicle, wherein each ECU operates to control a particular set of functions of the vehicle, such as engine controls, power train controls, transmission controls, brake controls, etc. The navigation application may operate in connection with one or more ECUs of the vehicle in order to carry out the functions described herein.

Figure 11:
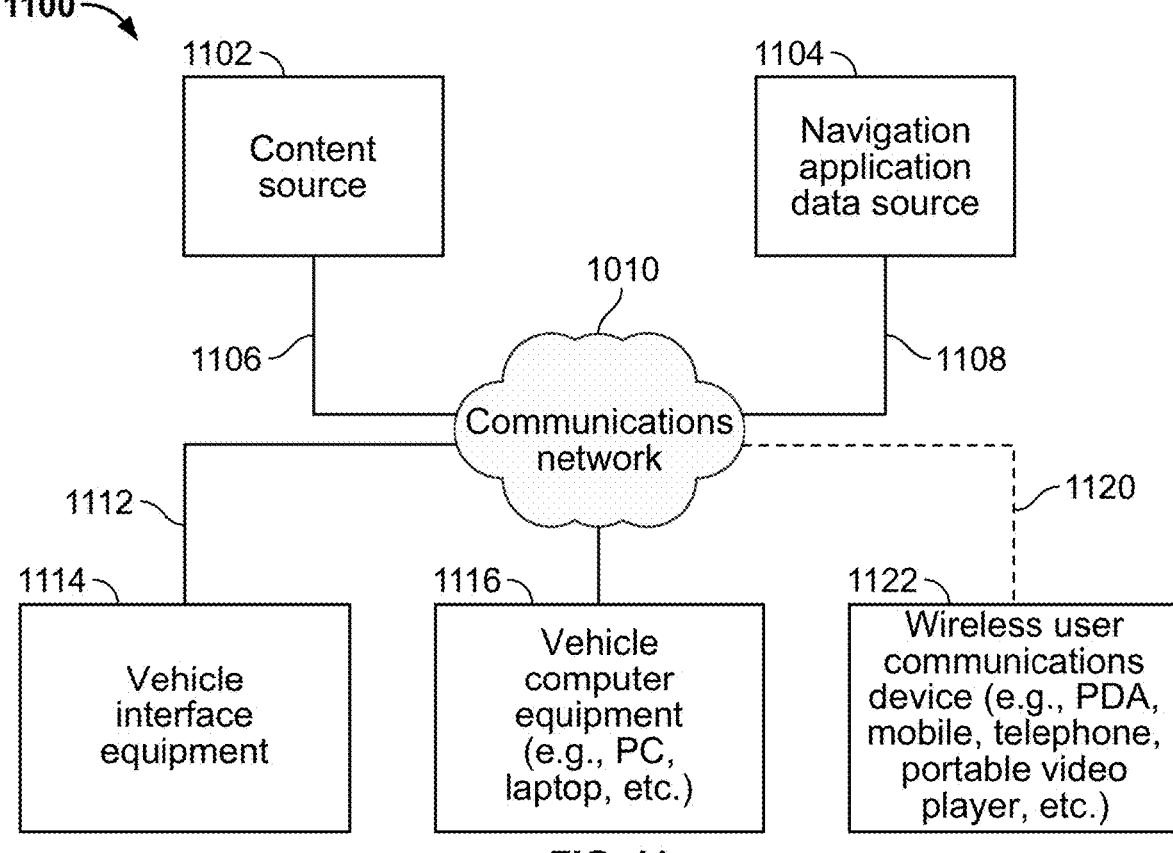
FIG. 11 depicts an illustrative system implementing the vehicle computing device of FIG. 10, according to aspects of the present disclosure.

Vehicle computing device 1000 of FIG. 10 can be implemented in system 1100 of FIG. 11 as vehicle interface equipment 1114, vehicle computer equipment 1116, wireless user communications device 1122 or any other type of user equipment. For simplicity, these devices may be referred to herein collectively as interface equipment or interface equipment devices and may be substantially similar to the vehicle computing device described above. Interface equipment devices, on which one or more functions of the interface application described herein may be implemented, may function as stand-alone devices or may be part of a network of devices. Various network configurations of devices may be implemented and are discussed in more detail below.

FIG. 11 depicts example systems, servers, and related hardware for enabling a navigation application to carry out the functions described herein, in accordance with some embodiments of the disclosure. An interface equipment device utilizing at least some of the system features described above in connection with FIG. 11 may not be classified solely as vehicle interface equipment 1114, vehicle computer equipment 1116 (e.g., backend processing equipment), or a wireless user communications device 1122. For example, vehicle interface equipment 1114 may, like some vehicle computer equipment 1116, be Internet-enabled, allowing for access to Internet content, while wireless user computer equipment 1122 may, like some vehicle interface equipment 1114, include a tuner allowing for access to media programming. The navigation application may have the same layout on various types of user equipment or may be tailored to the display capabilities of the interface equipment. For example, on wireless user computer equipment 1116, the navigation application may be provided as a website accessed by a web browser. In another example, the navigation application may be scaled down for wireless user communications devices 1122.

The interface equipment devices may be coupled to communications network 1110. Communications network 1110 may be one or more networks including the Internet, a mobile phone network, mobile voice or data network (e.g., a 4G, 5G, 6G, or LTE network), or other types of communications network or combinations of communications networks.

System 1100 includes content source 1102 and vehicle interface data source 1104 coupled to communications network 1110. Communications with the content source 1102 and the data source 1104 may be exchanged over one or more communications paths but are shown as a single path in FIG. 11 to avoid overcomplicating the drawing. Although communications between sources 1102 and 1104 with interface equipment devices 1114, 1116, and 1122 are shown through communications network 1110, in some embodiments, sources 1102 and 1104 may communicate directly with user equipment devices 1114, 1116, and 1122.

Content source 1102 may include one or more types of content distribution equipment including a media distribution facility, satellite distribution facility, programming sources, intermediate distribution facilities and/or servers, Internet providers, on-demand media servers, and other content providers. Navigation application data source 1104 may provide content data. Navigation application data may be provided to the interface equipment devices using any suitable approach. In some embodiments, navigation application data from data source 1104 may be provided to the interface equipment using a client/server approach. For example, an interface equipment device may pull data from a server, or a server may present the data to an interface equipment device.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

All of the features disclosed in this specification (including any accompanying claims, abstract, and drawings), and/or all of the steps of any method or process so disclosed, may be combined in any combination, except combinations where at least some of such features and/or steps are mutually exclusive.

Each feature disclosed in this specification (including any accompanying claims, abstract, and drawings), may be replaced by alternative features serving the same, equivalent, or similar purpose unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed. The claims should not be construed to cover merely the foregoing embodiments, but also any embodiments which fall within the scope of the claims.

Throughout the description and claims of this specification, the words "comprise" and "contain" and variations of them mean "including but not limited to", and they are not intended to (and do not) exclude other moieties, additives, components, integers, or steps. Throughout the description and claims of this specification, the singular encompasses the plural unless the context otherwise requires. In particular, where the indefinite article is used, the specification is to be understood as contemplating plurality as well as singularity, unless the context requires otherwise.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method comprising:
   receiving an input via a user interface of a vehicle, the input comprising a destination;
   determining a primary goal and a secondary goal, wherein the primary goal comprises identifying a traversable route from a starting location to the destination;
   determining a plurality of waypoints based on the secondary goal, wherein the plurality of waypoints comprises a plurality of external advertisement surfaces, and wherein the secondary goal comprises maximizing a number of external advertisement surfaces visible from the traversable route;
   determining a ranking of the plurality of waypoints based on (a) content displayed by each respective external advertisement surface and (b) a user profile associated with the input;
   determining a plurality of candidate routes based on the starting location and the destination;
   identifying, from among the plurality of candidate routes, based on a number of waypoints of the plurality of waypoints positioned along each respective route of the plurality of candidate routes and based on the ranking of the plurality of waypoints, a target route;
   generating for navigation by a vehicle, the target route; and
   displaying the generated target route on the user interface of the vehicle.

2. The method of claim 1, wherein the input via the user interface further comprises a natural language qualifier, and the secondary goal corresponds to the natural language qualifier, the method further comprising:
   determining the plurality of waypoints based on the natural language qualifier.

3. The method of claim 2, further comprising: determining the plurality of waypoints based on the natural language qualifier and the user profile comprising one or more of a digital photo album, a transaction history, or a digital wallet.

4. The method of claim 2, wherein the input via the user interface further comprises a natural language constraint, the method further comprising:
   identifying the target route from among the plurality of candidate routes based on the number of waypoints and based on the natural language constraint.

5. The method of claim 4, wherein the natural language constraint comprises a minimum vehicle autonomy level, and wherein identifying the target route from among the plurality of candidate routes comprises:
   determining that each segment of the target route has a corresponding vehicle autonomy level greater than or equal to the minimum vehicle autonomy level.

6. The method of claim 2, wherein identifying the target route further comprises:
   identifying a first target route having a first expected duration and passing by a first number of waypoints; and
   identifying a second target route having a second expected duration longer than the first expected duration and passing by a second number of waypoints that is greater than the first number of waypoints, wherein generating for navigation by the vehicle, the target route comprises:

generating, for display via the user interface, the first target route and the second target route; and generating, for display via the user interface, an indication that the second target route has a longer expected duration than the first target route and passes by a greater number of waypoints than the first target route.

7. The method of claim 1, further comprising:

determining that the vehicle is positioned proximate a first external advertisement surface along the target route; and generating for display inside the vehicle a supplemental advertisement corresponding to the first external advertisement surface.

8. The method of claim 1, further comprising determining that the vehicle is positioned proximate a first external advertisement surface along the target route; and instructing the first external advertisement surface to generate for display first content, wherein the first content is determined based on a user profile associated with the input.

9. The method of claim 1, wherein the vehicle comprises a first vehicle of a plurality of vehicles, the method further comprising: determining, for each vehicle of the plurality of vehicles, a respective target route, wherein each respective target route is determined based on: the location of the plurality of external advertisement surfaces; targeting requirements corresponding to each of the plurality of external advertisement surfaces; an expected time of arrival at one or more of the plurality of external advertisement surfaces along the respective target route; and a user profile associated with the vehicle of the plurality of vehicles.

10. A system comprising:

input/output circuitry configured to receive an input via a user interface of a vehicle, the input comprising a destination; and control circuitry configured to:

determine a primary goal and a secondary goal, wherein the primary goal comprises identifying a traversable route from a starting location to the destination;

determine a plurality of waypoints based on the secondary goal, wherein the plurality of waypoints comprises a plurality of external advertisement surfaces, and wherein the secondary goal comprises maximizing a number of external advertisement surfaces visible from the traversable route;

determine a ranking of the plurality of waypoints based on (a) content displayed by each respective external advertisement surface and (b) a user profile associated with the input;

determine a plurality of candidate routes based on the starting location and the destination;

identify, from among the plurality of candidate routes, based on a number of waypoints of the plurality of waypoints positioned along each respective route of the plurality of candidate routes and based on the ranking of the plurality of waypoints, a target route; and display the generated target route on the user interface of the vehicle;

wherein the input/output circuitry is further configured to generate for navigation by a vehicle, the target route.

11. The system of claim 10, wherein the input via the user interface further comprises a natural language qualifier, and the secondary goal corresponds to the natural language qualifier, and wherein the control circuitry is further configured to:

determine the plurality of waypoints based on the natural language qualifier.

12. The system of claim 11, wherein the control circuitry is further configured to: determine the plurality of waypoints based on the natural language qualifier and the user profile comprising one or more of a digital photo album, a transaction history, or a digital wallet.

13. The system of claim 11, wherein the input via the user interface further comprises a natural language constraint, wherein the control circuitry is further configured to:

identify the target route from among the plurality of candidate routes based on the number of waypoints and based on the natural language constraint.

14. The system of claim 13, wherein the natural language constraint comprises a minimum vehicle autonomy level, and wherein the control circuitry is further configured to identify the target route from among the plurality of candidate routes by determining that each segment of the target route has a corresponding vehicle autonomy level greater than or equal to the minimum vehicle autonomy level.

15. The system of claim 11, wherein the control circuitry configured to identify the target route is further configured to:

identify a first target route having a first expected duration and passing by a first number of waypoints; and identify a second target route having a second expected duration longer than the first expected duration and passing by a second number of waypoints that is greater than the first number of waypoints, wherein the input/output circuitry configured to generate for navigation by the vehicle, the target route comprises:

generating, for display via the user interface, the first target route and the second target route; and generating, for display via the user interface, an indication that the second target route has a longer expected duration than the first target route and passes by a greater number of waypoints than the first target route.

16. The system of claim 10, wherein the control circuitry is further configured to:

determine that the vehicle is positioned proximate a first external advertisement surface along the target route; and the input/output circuitry is further configured to generate for display inside the vehicle a supplemental advertisement corresponding to the first external advertisement surface.

17. The system of claim 10, wherein the control circuitry is further configured to: determine that the vehicle is positioned proximate a first external advertisement surface along the target route; and instruct the first external advertisement surface to generate for display first content, wherein the first content is determined based on a user profile associated with the input.

18. The system of claim 10, wherein the vehicle comprises a first vehicle of a plurality of vehicles, and wherein the control circuitry is further configured to: determine, for each vehicle of the plurality of vehicles, a respective target route, wherein each respective target route is determined based on: the location of the plurality of external advertisement surfaces; targeting requirements corresponding to each of the plurality of external advertisement surfaces; an expected time of arrival at one or more of the plurality of external advertisement surfaces along the respective target route; and a user profile associated with the vehicle of the plurality of vehicles.

* * * * *